(12) United States Patent
Kitamura et al.

(10) Patent No.: US 10,583,590 B2
(45) Date of Patent: Mar. 10, 2020

(54) CONTROLLER AND CONTROL METHOD

(71) Applicant: KIKUSUI SEISAKUSHO LTD., Kyoto-shi (JP)

(72) Inventors: Naoshige Kitamura, Kyoto (JP); Shinsuke Fushimi, Kyoto (JP)

(73) Assignee: KIKUSUI SEISAKUSHO LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 16/212,518

(22) Filed: Dec. 6, 2018

(65) Prior Publication Data

US 2019/0193309 A1 Jun. 27, 2019

(30) Foreign Application Priority Data

Dec. 25, 2017 (JP) ................. 2017-247935

(51) Int. Cl.
*B29C 43/18* (2006.01)
*B30B 11/08* (2006.01)
*B30B 15/00* (2006.01)
*B29C 43/08* (2006.01)
*B30B 11/00* (2006.01)

(52) U.S. Cl.
CPC ............ *B29C 43/183* (2013.01); *B29C 43/08* (2013.01); *B30B 11/005* (2013.01); *B30B 11/08* (2013.01); *B30B 15/0011* (2013.01); *B30B 15/0088* (2013.01)

(58) Field of Classification Search
None
See application file for complete search history.

(56) References Cited

U.S. PATENT DOCUMENTS

| 4,047,866 | A | 9/1977 | Shah |
| 4,373,888 | A | 2/1983 | Yamamoto |
| 6,079,968 | A | 6/2000 | Schmitz et al. |
| 2008/0258343 | A1* | 10/2008 | Tado ....................... B30B 11/08 264/338 |
| 2015/0217489 | A1 | 8/2015 | Oneda |
| 2016/0361885 | A1* | 12/2016 | Oyama ................ B30B 15/302 |
| 2017/0281552 | A1* | 10/2017 | Oyama ............. G01N 21/3563 |
| 2017/0282421 | A1* | 10/2017 | Kitamura .............. B30B 15/302 |
| 2018/0162023 | A1* | 6/2018 | Kitamura .............. B30B 11/005 |

FOREIGN PATENT DOCUMENTS

| EP | 0 842 763 A2 | 5/1998 |
| JP | 2015-164740 A | 9/2015 |

* cited by examiner

*Primary Examiner* — Mary Lynn F Theisen
(74) *Attorney, Agent, or Firm* — McGinn I.P. Law Group, PLLC.

(57) ABSTRACT

A controller is configured to adjust, by increasing or decreasing an amount of a lubricant mixed with the powdery material, an amount of a lubricant applied to an inner circumference of a die bore and tips, or a time to mix the lubricant to be mixed with the powdery material and the powdery material, in accordance with whether or not the molded product has defectiveness, a pressure applied to the lower punch pushing the molded product out of the die bore, a temperature of the die bore, the upper punch, or the lower punch, a temperature of the powdery material, or a humidity of the powdery material.

20 Claims, 20 Drawing Sheets

CONTROLLER AND CONTROL METHOD

BACKGROUND

There has been known a rotary compression-molding machine including a table of a turret having die bores, and an upper punch and a lower punch slidably retained above and below each of the die bores, and configured to horizontally rotate the die bores and the punches together to compression mold or tablet a powdery material filled in the die bores when the paired upper and lower punches pass between an upper roll and a lower roll (see, for example, JP 2015-164740 A).

The molding machine of this type is typically configured to spray to apply a lubricant to an inner circumferential surface of each of the die bores and tips before filling the die bores with the powdery material and compression molding. The lubricant prevents the powdery material from adhering to the die bores and the punches, and examples thereof include wax made of magnesium stearate or the like, and talc.

The lubricant can preliminarily be mixed with the powdery material to be filled in the die bores as a constituent material for molded products. Examples of an additive to be added to a principal agent (i.e., a main ingredient or an active ingredient) include such an internal lubricant as well as an excipient appropriately increasing volume and weight of the molded products, a binder binding particles of the powdery material, and a disintegrant absorbing moisture to enable easy disintegration of the molded products. Examples of the disintegrant include starch, crystalline cellulose, and a carbonate.

A molded product production site can have serious tableting failure like binding of the powdery material remaining on the inner circumference of the die bore to obtain a chipped molded product, sticking of the powdery material remaining at the punch tip to obtain a chipped-molded product, and capping to obtain a broken-molded product. The molded product can also have inadequate hardness.

High friction between the molded product compressed in the die bore and the inner circumference of the die bore leads to high pressure applied to the lower punch that is pushing the molded product out of the die bore. This may cause abrasion or damage of a cam rail engaged with a head of the lower punch to push the lower punch upward or the head of the lower punch.

SUMMARY OF THE INVENTION

It is an exemplary object of the present invention to inhibit defectiveness of a molded product during production of the molded product with use of a compression-molding machine, or wear of a constituent member of the molding machine.

The invention exemplarily provides a controller for a compression-molding machine configured to fill a die bore with a powdery material and to compress the powdery material with use of an upper punch and a lower punch to obtain a molded product, or a powdery-material feeding device configured to feed the compression-molding machine with the powdery material, and the controller is configured to adjust by increasing or decreasing an amount of a lubricant mixed with the powdery material, an amount of a lubricant applied to an inner circumference of the die bore and tips, or a time to mix the lubricant to be mixed with the powdery material and the powdery material, in accordance with whether or not the molded product has defectiveness, pressure applied to the lower punch pushing the molded product out of the die bore, temperature of the die bore, the upper punch, or the lower punch, temperature of the powdery material, or humidity of the powdery material. This configuration inhibits defectiveness of the molded product during production of the molded product with use of the compression-molding, or wear of a constituent member of the molding machine.

A powdery material is an aggregate of minute solids and conceptually includes an aggregate of particles such as so-called granules and an aggregate of powder smaller than such particles. Examples of the powdery material include a powdery material containing a principal agent, and an additive like a lubricant, an excipient, a binder, a disintegrant, a stabilizer, or a preservative. The powdery material according to the exemplary invention also includes a mixture of two or more types of powdery materials, and a mixture of a powdery principal agent and a powdery additive.

Upon occurrence of binding or sticking of the powdery material adhering to and remaining on the inner circumference of the die bore or the punch tip, the controller increases the amount of the lubricant mixed with the powdery material, increases the amount of the lubricant applied to the inner circumference of the die bore and the punch tips, or prolongs the time to mix the lubricant to be mixed with the powdery material and the powdery material, to inhibit binding or sticking.

When the pressure applied to the lower punch pushing the molded product out of the die bore is more than a threshold, the controller increases the amount of the lubricant mixed with the powdery material, increases the amount of the lubricant applied to the inner circumference of the die bore and the punch tip, or prolongs the time to mix the lubricant to be mixed with the powdery material and the powdery material, to reduce friction between the molded product compressed in the die bore and the inner circumference of the die bore and decrease pressure applied to the lower punch.

When the molded product has hardness less than a threshold, the controller decreases the amount of the lubricant mixed with the powdery material, to enhance hardness of the molded product.

Upon occurrence of capping of the molded product broken into a plurality of portions, the controller decreases the amount of the lubricant mixed with the powdery material, to inhibit capping.

The exemplary invention also provides a control method for a compression-molding machine or a powdery-material feeding device, and the control method includes adjusting by increasing or decreasing an amount of a lubricant mixed with the powdery material, an amount of a lubricant applied to an inner circumference of the die bore and tips, or time to mix the lubricant to be mixed with the powdery material and the powdery material, in accordance with whether or not the molded product has defectiveness, pressure applied to the lower punch pushing the molded product out of the die bore, temperature of the die bore, the upper punch, or the lower punch, temperature of the powdery material, or humidity of the powdery material, to inhibit defectiveness of the molded product during production of the molded product with use of the compression-molding machine or wear of a constituent member of the molding machine.

The exemplary invention inhibits defectiveness of a molded product during production of the molded product with use of a compression-molding machine, or wear of a constituent member of the molding machine.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF AN EXEMPLARY EMBODIMENT

Figure 1:
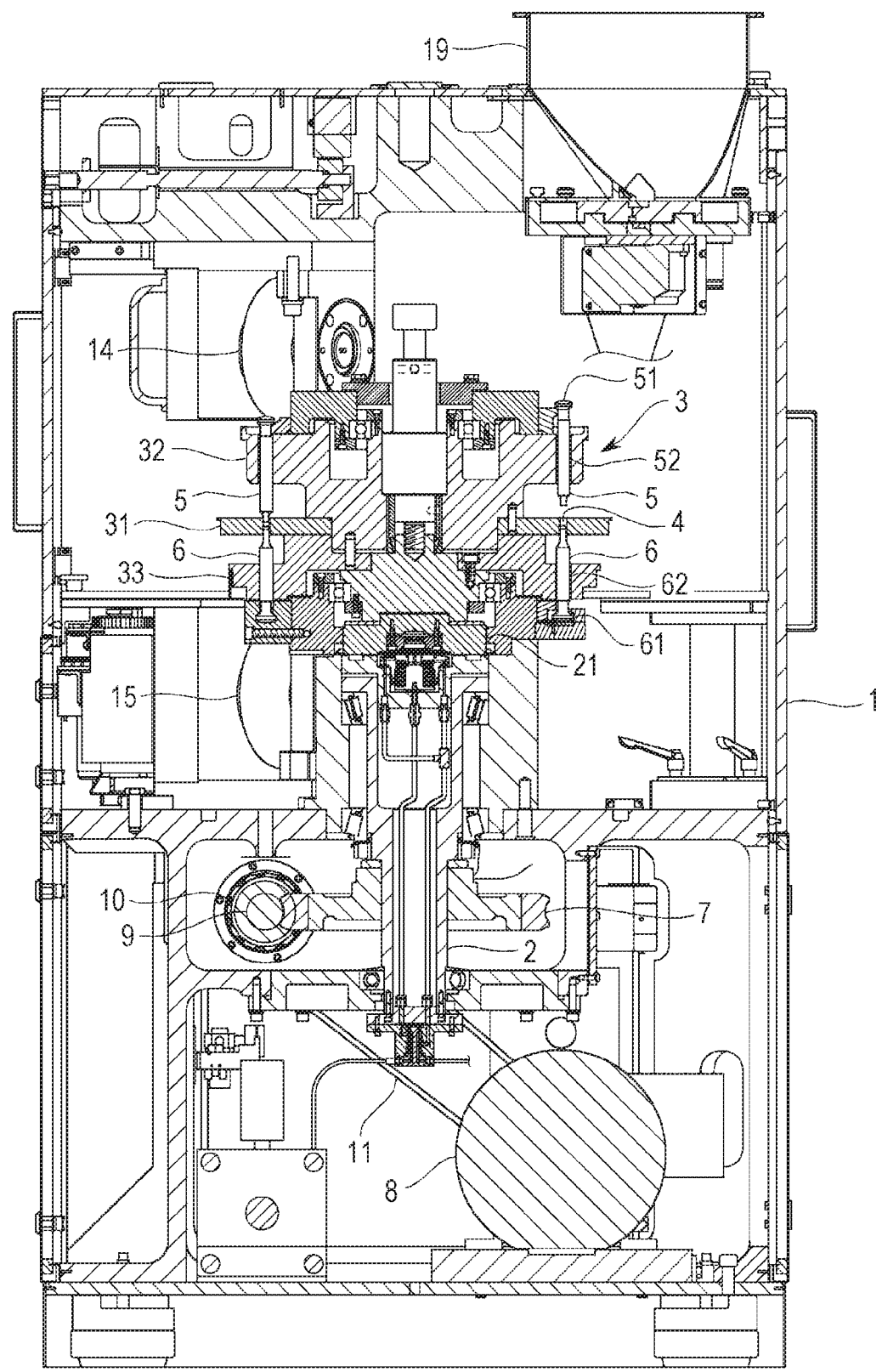
FIG. 1 is a side sectional view of a rotary compression-molding machine according to an exemplary embodiment of the invention.

An exemplary embodiment of the invention will now be described with reference to the drawings. Initially described is an overview of an entire rotary compression-molding machine (hereinafter, referred to as the "molding machine") according to the exemplary embodiment. As shown exemplarily in FIG. 1, the molding machine includes a frame 1 accommodating an upright shaft 2 that functions as a rotary shaft, and a turret 3 that is attached to a connection portion 21 disposed at the top of the upright shaft 2. A worm wheel 7 is attached to the lower end of the upright shaft 2. The worm wheel 7 meshes with a worm gear 10. The worm gear 10 is fixed to a gear shaft 9 that is driven by a motor 8. Drive power outputted from the motor 8 is transmitted to the gear shaft 9 by way of a belt 11, so as to rotate the upright shaft 2 by way of the worm gear 10 and the worm wheel 7. Rotation of the upright shaft 2 causes rotation of the turret 3 and upper and lower punches 5 and 6.

Figure 2:
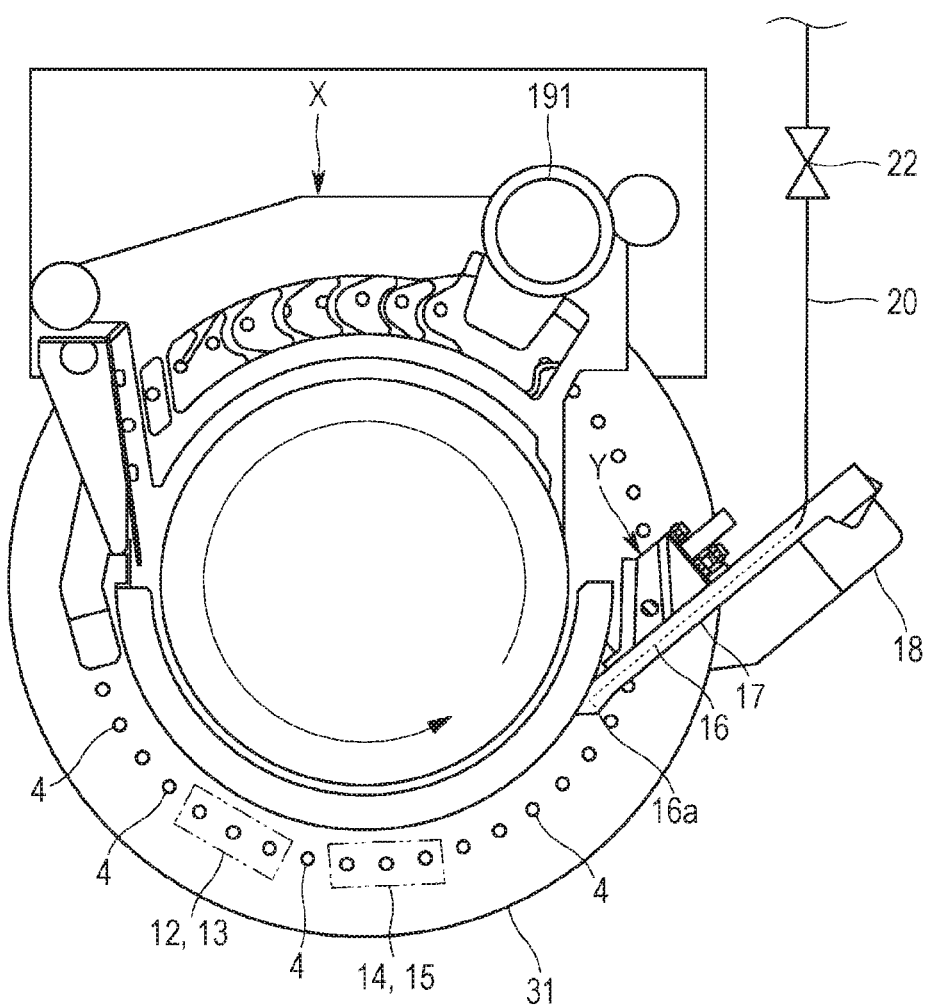
FIG. 2 is a plan view of a main part of the rotary compression-molding machine according to the exemplary embodiment.

The turret 3 horizontally rotates about the upright shaft 2, and more specifically, spins. The turret 3 includes a table (e.g., die disc) 31, an upper punch retaining portion 32, and a lower punch retaining portion 33. As shown exemplarily in FIG. 2, the table 31 has a substantially circular disc shape, and has a plurality of die bores 4 that is disposed in an outer circumferential portion and is aligned in a direction of rotation at predetermined intervals. Each of the die bores 4 vertically penetrates the table 31. The table 31 can alternatively include a plurality of divided plates. Instead of the die bores 4 formed directly in the table 31, a die member including the die bores 4 can be attached to the table 31.

The upper and lower punches 5 and 6 are disposed above and below each of the die bores 4 and are individually vertically slidable along the die bores 4. The upper punch retaining portion 32 retains upper punch trunks 52 while the lower punch retaining portion 33 retains lower punch trunks 62. The upper punches 5 each have a punch tip 53 that enters and exits corresponding one of the die bores 4. The lower punches 6 each have a punch tip 63 that is kept inserted in corresponding one of the die bores 4. The upper and lower punches 5 and 6 horizontally rotate about the upright shaft 2 along with the turret 3, more specifically, revolve.

Figure 16:
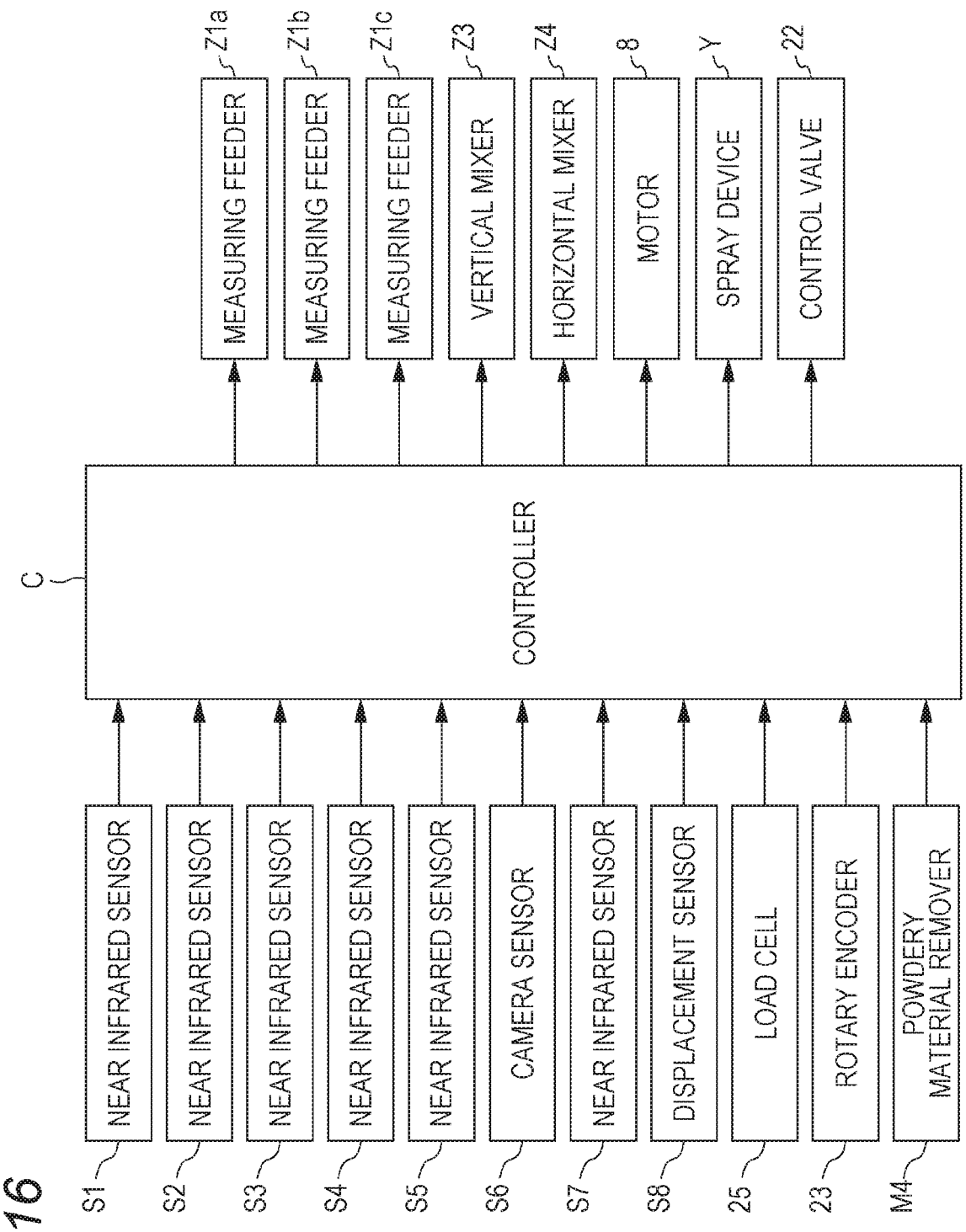
FIG. 16 is a block diagram of a control system in a system according to the exemplary embodiment.
Figure 17:
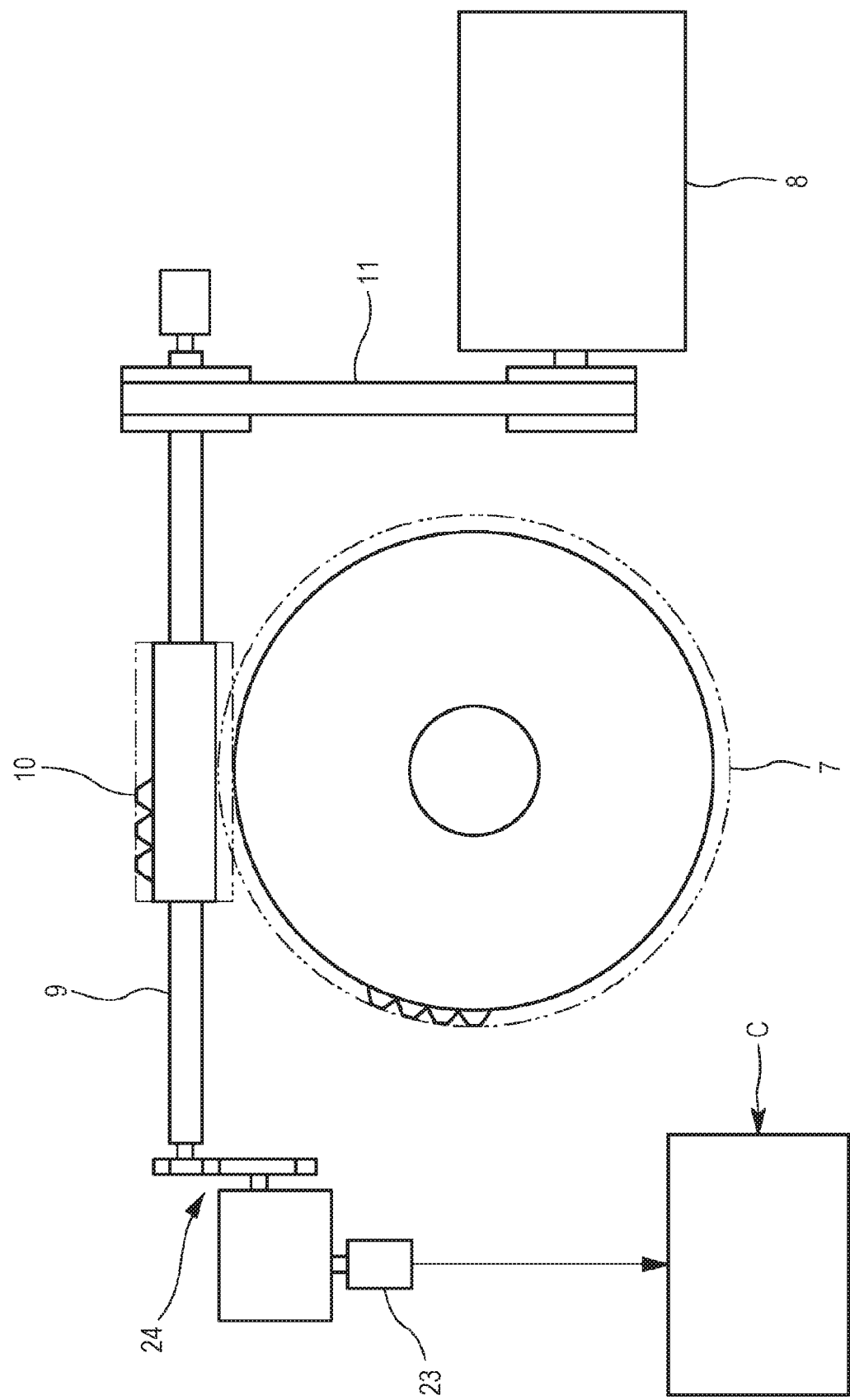
FIG. 17 is a plan view of a main part including a mounting position of a rotary encoder in the rotary compression-molding machine according to the exemplary embodiment.

As shown exemplarily in FIG. 17, the gear shaft 9 has an end connected, via a reduction gear 24, with a rotary encoder 23 configured to detect a rotation angle and rotational speed of the gear shaft 9 as well as (the table 31, the die bores 4, and the punches 5 and 6 of) the turret 3. The rotary encoder 23 outputs a pulse signal every time the gear shaft 9 rotates by a predetermined angle. Upon receipt of a train of the pulse signals, a controller C included in a system according to the exemplary embodiment is configured to detect the rotation angle and the rotational speed of the turret 3 (i.e., find a current position of each of the die bores 4 on the table 31). Examples of the controller C shown exemplarily in FIG. 16 include a microcomputer system including a processor, a memory, an auxiliary storage device, an input/output interface, a programmable controller, a general-purpose personal computer, and a work station. The reduction gear 24 reduces the rotational speed of the gear shaft 9 to be adapted to input speed of the rotary encoder 23 and transmits the reduced rotational speed to the rotary encoder 23.

Figure 10:
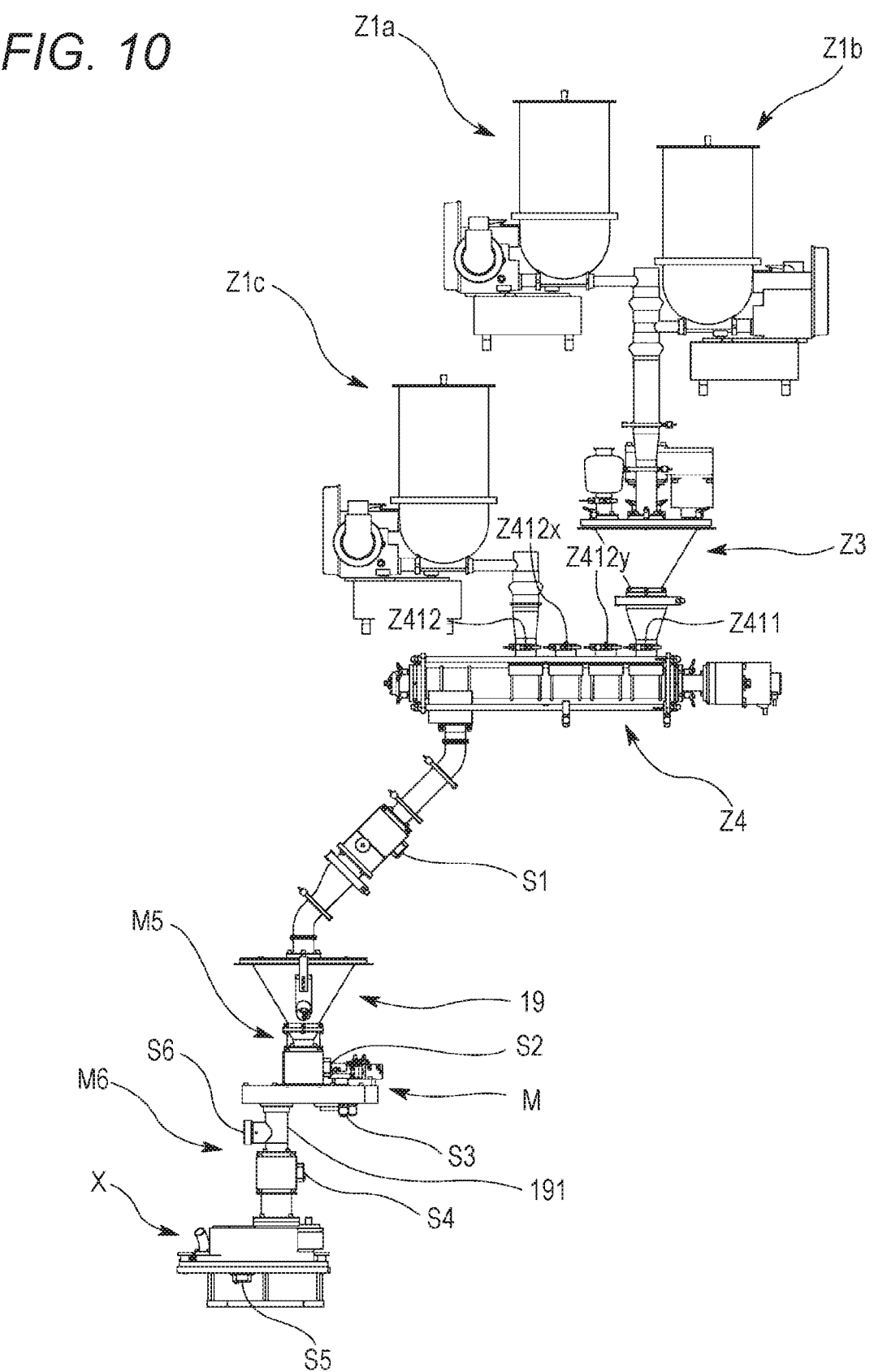
FIG. 10 is a side view of a main part of the powdery material-mixing and feeding device according to the exemplary embodiment.
Figure 11:
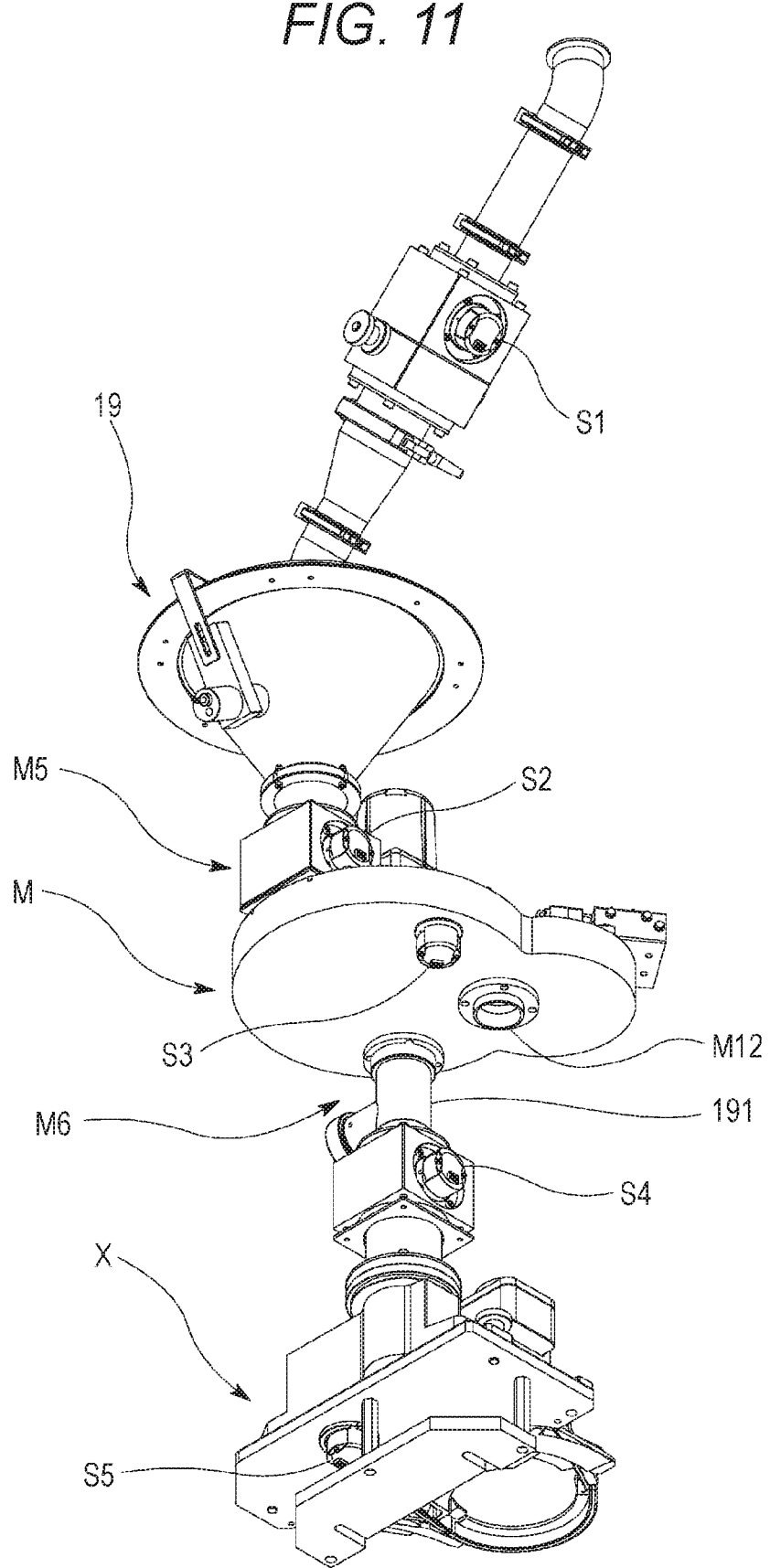
FIG. 11 is a perspective view of the main part of the powdery material-mixing and feeding device according to the exemplary embodiment.

A feeder X functioning as a filling device is provided to fill the die bores 4 of the turret 3 with a powdery material. The feeder X can be a gravity feeder configured to simply drop a powdery material into the die bores 4 or an agitated feeder configured to drop, into the die bores 4, a powdery material being agitated by rotating an incorporated agitating rotor. The exemplary embodiment assumes that the feeder X is the agitated feeder. The feeder X is positioned on the outer circumferential portion of the rotating table 31, particularly, just above a revolution orbit of the die bores 4. A powdery material is fed to the feeder X from a powdery-material feed pipe 191 (shown exemplarily in FIGS. 10 and 11) functioning as a discharger M6 of a powdery material mixing degree measurement device M. A buffer tank 19 is provided to feed a feeding unit M5 of the powdery material mixing degree measurement device M with a powdery material.

A spray device Y is configured to spray an external lubricant toward inner circumferential surfaces of the die bores 4, upper end surfaces of the punch tips 63 of the lower punches 6, and lower end surfaces of the punch tips 53 of the upper punches 5. The lubricant prevents binding of the powdery material adhering to the inner circumference of the die bore 4 and sticking of the powdery material adhering to the punch tip 53 or 63 of the punch 5 or 6 (both of which cause a scratch, roughness, or chipping of a product). Examples of the lubricant include metal stearate (particularly magnesium stearate) and talc.

Figure 19:
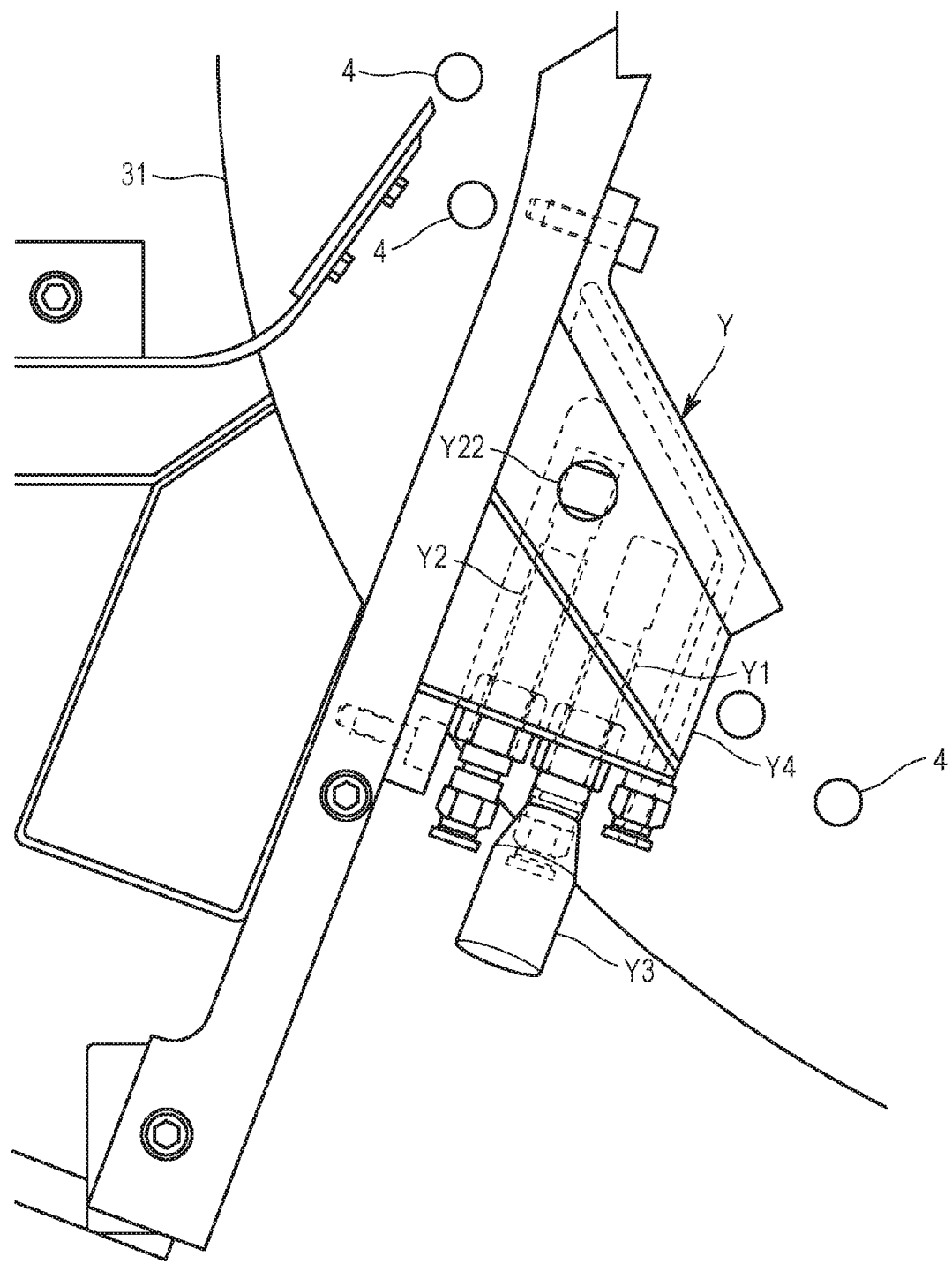
FIG. 19 is an enlarged plan view of a main part of a spray device in the rotary compression-molding machine according to the exemplary embodiment.

As shown exemplarily in FIG. 19, the spray device Y includes, as its elements, a downward spray nozzle Y1 configured to guide a lubricant fed from an external lubricant feeding device (not shown) and to spray the lubricant toward the die bore 4 and the upper end surface of the punch tip 63 of the lower punch 6, an upward spray nozzle Y2 configured to guide a lubricant fed from the lubricant feeding device and to spray the lubricant toward the lower end surface of the punch tip 53 of the upper punch 5, a purging suction duct Y3 configured to suck an excessive lubricant or the like not adhering to the die bore 4 or the punch tip 53 or 63 of the punch 5 or 6 and to discharge the sucked lubricant or the like (the lubricant may be fed back to the lubricant feeding device), and a case Y4 retaining the downward spray nozzle Y1, the upward spray nozzle Y2, and the suction duct Y3.

Figure 20:
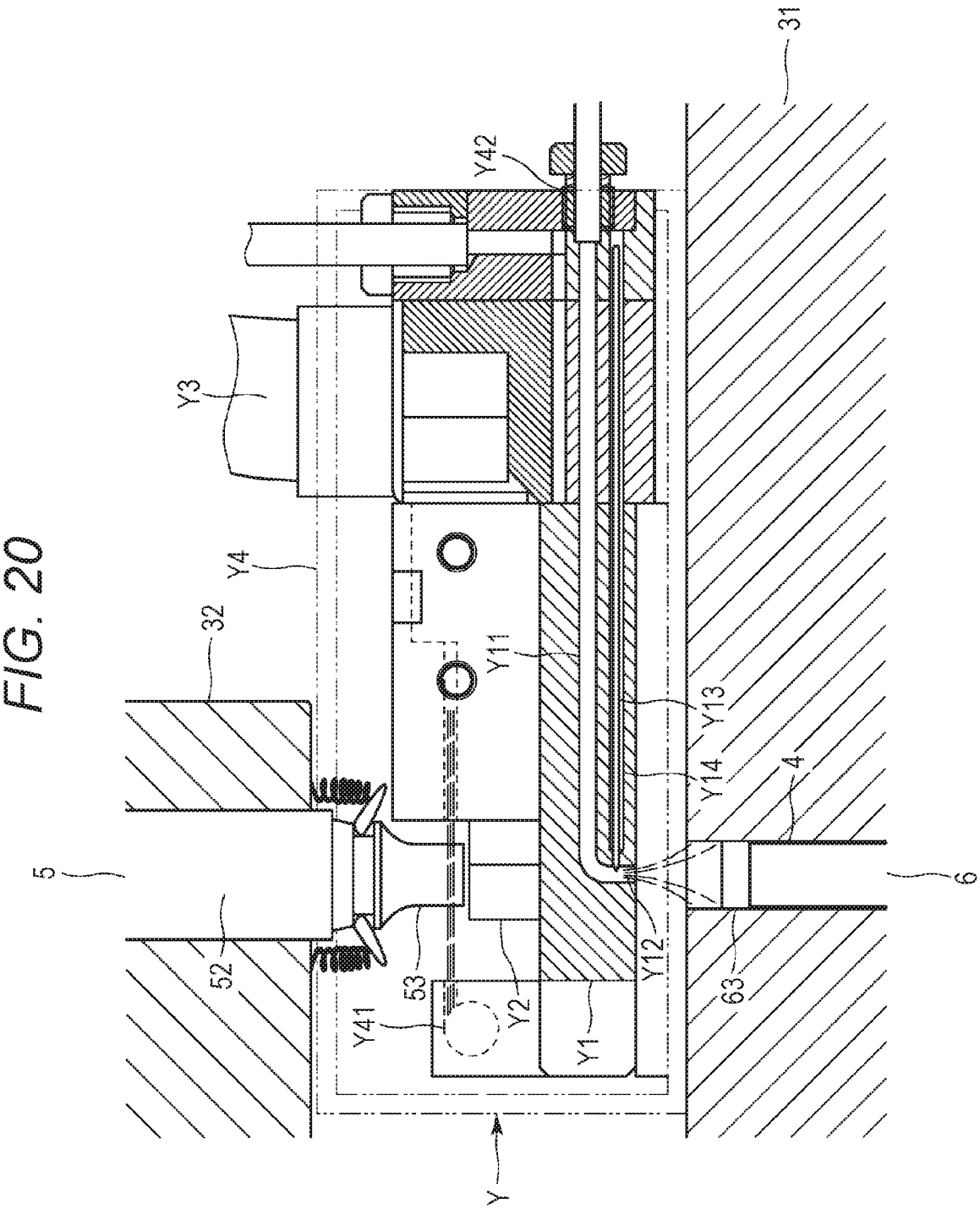
FIG. 20 is a side sectional view of the main part of the spray device in the rotary compression-molding machine according to the exemplary embodiment.

As shown exemplarily in FIG. 20, the downward spray nozzle Y1 has a distribution pipe Y11 bored in a block made of a fluororesin (particularly polytetrafluoroethylene) so as to extend in a substantially horizontal direction, and a spray port Y12 formed by bending downward the terminal end of the distribution pipe Y11 so as to be opened to the lower surface of the block. The distribution pipe Y11 and the spray port Y12 have inner surfaces as flat surfaces of the fluororesin, thereby smoothing distribution and spraying of the lubricant. The downward spray nozzle Y1 has a static electricity generation electrode Y13 buried therein. The static electricity generation electrode Y13 has a distal end in a needle or a tapered shape, which protrudes in an area near the spray port Y12. The static electricity generation electrode Y13 receives high DC voltage of about −20 kV, and forcibly electrostatically charges the lubricant immediately before being sprayed with an electric field concentrated at the distal end thereof.

The upward spray nozzle Y2 is structured such that the downward spray nozzle Y1 shown exemplarily in FIG. 20 is placed upside down. More specifically, the upward spray nozzle Y2 has a distribution pipe formed by boring a hole in a block made of a fluororesin and extending in a substantially horizontal direction, and a spray port Y22 formed by bending upward the terminal end of the distribution pipe so as to be opened to the upper surface of the block. The upward spray nozzle Y2 also has a static electricity generation electrode buried therein. The static electricity generation electrode has a distal end in a needle or tapered shape, which protrudes in an area near the spray port Y22.

The suction duct Y3 is disposed at a level to face a side of the punch tip 53 of the upper punch 5. The suction duct Y3 has an opening portion fixed to the case Y4 and communicating with an internal space of the case Y4.

The case Y4 is a box that is made of a fluororesin and mostly covers the downward spray nozzle Y1 and the upward spray nozzle Y2 so as to prevent random dispersion of the lubricant. The case Y4 is electrically insulated from the turret 3 and the spray nozzles Y1 and Y2. The case Y4 has an air curtain Y41 of compressed air brown out substantially in a horizontal direction toward the opening of the suction duct Y3. The air curtain Y41 forms an air flow near the punch tip 53 of the upper punch 5, and prevents upward scatter of the lubricant that is sprayed from the upward spray nozzle Y2 toward the punch tip 53 of the upper punch 5.

The external lubricant feeding device is known in the art and includes a μR feeder (manufactured by NISSHIN ENGINEERING INC.) configured to eject the lubricant accurately and stably little by little through a filling roll of a thin-groove filling type and pneumatically feed the ejected lubricant along with pressurized air.

The lubricant fed from the lubricant feeding device is divided into the downward spray nozzle Y1 and the upward spray nozzle Y2, flows through the distribution pipes in the nozzles Y1 and Y2, and is sprayed out of the spray ports Y12 and Y22. The lubricant being sprayed is forcibly electrostatically charged. The die bore 4 and the punches 5 and 6 are grounded via the ground of the turret 3. The electrostatically charged lubricant strongly adheres to the inner circumferential surface of the die bore 4, the upper end surface of the punch tip 63 of the lower punch 6, and the lower end surface of the punch tip 53 of the upper punch 5, which are metal surfaces. The lubricant having adhered is not separated by vibration caused by vertical motion of the punches 5 and 6 or by wind pressure caused by rapid rotation of the turret 3, is pressed strongly against a powdery material simultaneously when the punches 5 and 6 compression mold the powdery material, and is transferred from the die bore 4 and the punch tips 53 and 63 of the punches 5 and 6 to adhere to a tablet.

Figure 3:
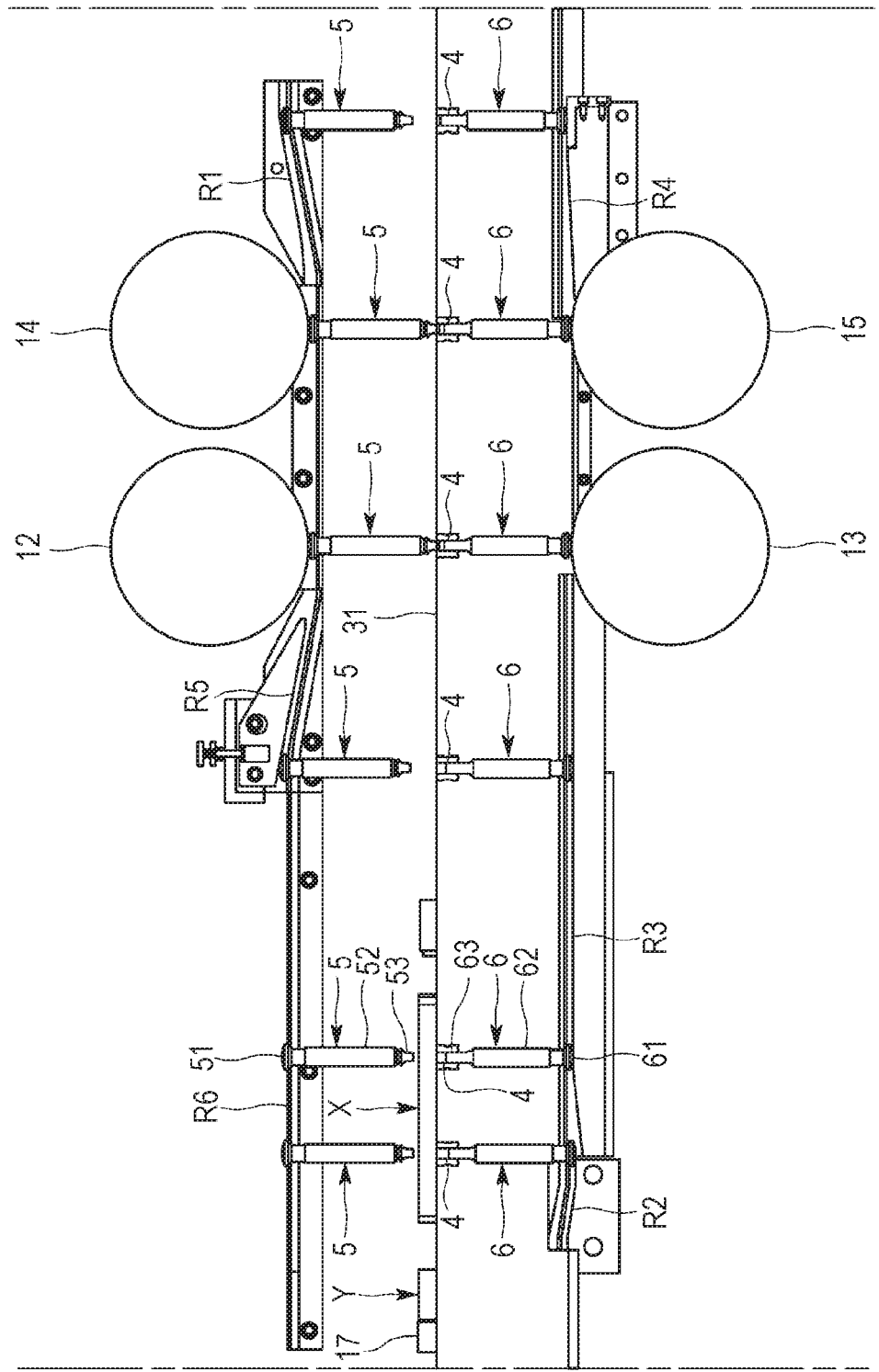
FIG. 3 is a cylindrical view of the rotary compression-molding machine according to the exemplary embodiment.

As shown exemplarily in FIG. 3, a preliminary compression upper roll 12, a preliminary compression lower roll 13, a substantial compression upper roll 14, and a substantial compression lower roll 15 are disposed on orbits of the upper and lower punches 5 and 6 that revolve about the upright shaft 2. The preliminary compression upper roll 12 and the preliminary compression lower roll 13, as well as the substantial compression upper roll 14 and the substantial compression lower roll 15, are respectively paired in the vertical direction so as to sandwich the upper and lower punches 5 and 6. The preliminary compression upper roll 12 and the substantial compression upper roll 14 each press a head 51 of each of the upper punches 5, and the preliminary compression lower roll 13 and the substantial compression lower roll 15 each press a head 61 of each of the lower punches 6. The preliminary compression upper roll 12 and the preliminary compression lower roll 13, as well as the substantial compression upper roll 14 and the substantial compression lower roll 15, bias the upper and lower punches 5 and 6 to come closer to each other, so that end surfaces of the punch tips 53 and 63 compress from above and below a powdery material filled in the die bores 4.

The upper and lower punches 5 and 6 have the heads 51 and 61 pressed by the rolls 12, 13, 14, and 15, and the trunks 52 and 62 smaller in diameter than the heads 51 and 61. The upper punch retaining portion 32 of the turret 3 vertically slidably retains the trunks 52 of the upper punches 5, whereas the lower punch retaining portion 33 vertically slidably retains the trunks 62 of the lower punches 6. The punch tips 53 and 63 of the trunks 52 and 62 are thinner than the remaining portions and are substantially equal in diameter to an inner diameter of the die bores 4 so as to be inserted to the die bores 4. The punches 5 and 6 revolve to cause the rolls 12, 13, 14, and 15 to come closer to the heads 51 and 61 of the punches 5 and 6. The rolls 12, 13, 14, and 15 come into contact with the heads 51 and 61 so as to step thereonto. The rolls 12, 13, 14, and 15 further press the upper punches 5 downward and press the lower punches 6 upward. While the rolls 12, 13, 14, and 15 are in contact with flat surfaces of the punches 5 and 6, the punches 5 and 6 keep applying required pressure to a powdery material in the die bores 4.

Figure 18:
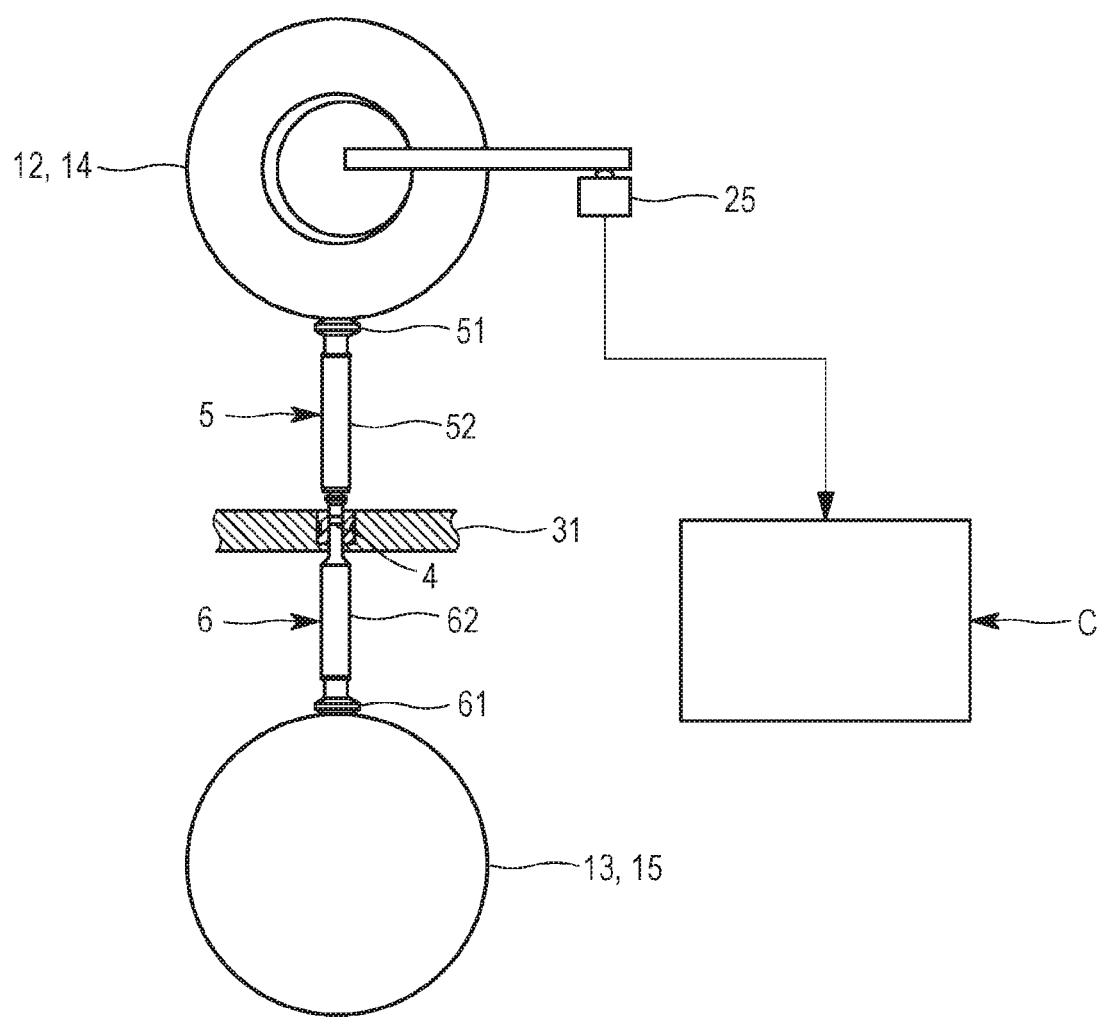
FIG. 18 is a configuration diagram of a roll and a load cell included in the rotary compression-molding machine according to the exemplary embodiment.

As shown exemplarily in FIG. 18, the upper rolls 12 and 14 of the molding machine each have a load cell 25 configured to detect pressure applied to compress the powdery material in the die bore 4 by the rolls 12, 13, 14, and 15 via the punches 5 and 6. The controller C receives a signal transmitted from each of the load cells 25 disposed at the rolls 12 13, 14, and 15 to find a magnitude of pressure applied to compress the powdery material by the preliminarily compression rolls 12 and 13 (i.e., preliminary compression pressure) and a magnitude of pressure applied to compress the powdery material by the substantial compression rolls 14 and 15 (i.e., substantial compression pressure). The signals outputted from the load cells 25 form a pulse signal train having a peak when each of the pairs of punches 5 and 6 compresses the powdery material in a corresponding one of the die bores 4 with a maximum pressure. The controller C thus counts the number of pulse signal trains to find the number of molded products produced by the molding machine per unit time.

A molded-product collector is disposed downstream, in the direction of rotation of the turret 3 and the punches 5 and 6, of the position where the substantial compression upper roll 14 and the substantial compression lower roll 15 apply pressure. This molded-product collector includes a guide member 17 configured to guide a molded product pushed out of each of the die bores 4. The guide member 17 extends to have a proximal end located at a molded-product collecting position 18 and a distal end located closer to the center of the table 31 than a rotation locus of the die bores 4. A molded product pushed out of each of the die bores 4 by the corresponding lower punch 6 comes into contact with the guide member 17 and moves toward the molded-product collecting position 18.

Vertical motion of the upper and lower punches 5 and 6 are caused by cam rails R1, R2, R3, R4, R5, and R6. The rails R1, R2, R3, R4, R5, and R6 extend along the direction of rotation (i.e., revolution) of the punches 5 and 6, and are engaged with the heads 51 and 61 of the punches 5 and 6 to guide and vertically move the punches 5 and 6.

As shown exemplarily in FIG. 3, the head 51 of each of the upper punches 5 has a revolution orbit including the ascending rail (i.e., ascending cam) R1 configured to lift the upper punch 5 upward at a position upstream of the guide member 17 and extract the punch tip 53 from the die bore 4, and the descending rail (i.e., descending cam) R5 configured to push the upper punch 5 downward at a position upstream of the rolls 12 and 14 and insert the punch tip 53 to the die bore 4 to be ready for later compression of the powdery material.

The head 61 of each of the lower punches 6 has a revolution orbit including the push-up rail R4 configured to lift the lower punch 6 upward at a position upstream of the guide member 17 to allow the punch tip 63 to be substantially as high as the upper surface of the table 31, the lowering unit R2 configured to pull the lower punch 6 downward at a position upstream of or adjacent to the feeder X to set volume of the die bore 4 above the punch tip 63 to correspond to the amount of the powdery material as a constituent material for the molded product, and the quantity control rail R3 configured to slightly lift the lower punch 6 upward at a position downstream of the feeder X to finely adjust the amount of the powdery material to be filled in the die bore 4. The quantity control rail R3 has a latter half configured to slightly pull the lower punch 6 downward to prevent the powdery material having been adjusted in quantity and filled in the die bore 4 from spilling from the die bore 4 due to centripetal force or the like.

A process of producing a molded product will be described briefly. As shown exemplarily in FIG. 3, the lower punch 6 initially descends and the spray device Y sprays the lubricant toward the inner circumferential surface of the die bore 4 into which the punch tip 63 of the lower punch 6 is inserted, the upper end surface of the punch tip 63 of the lower punch 6, and the lower end surface of the punch tip 53 of the upper punch 5 (i.e., external lubricant spraying). The feeder X fills, with a powdery material (i.e., mixed-powdery materials), the die bore 4 into which the punch tip 63 of the lower punch 6 is inserted (i.e., filling). The lower punch 6 ascends and the powdery material overflowing the die bore 4 is leveled such that the die bore 4 is filled with a required amount of the powdery material.

The upper punch 5 then descends, and the preliminary compression upper roll 12 and the preliminary compression lower roll 13 press the head 51 of the upper punch 5 and the head 61 of the lower punch 6, such that the punch tips 53 and 63 of the punches 5 and 6 preliminarily compress the powdery material in the die bore 4. The substantial compression upper roll 14 and the substantial compression lower roll 15 subsequently press the head 51 of the upper punch 5 and the head 61 of the lower punch 6, such that the punch tips 53 and 63 of the punches 5 and 6 substantially compress the powdery material in the die bore 4 (i.e., compression molding).

The lower punch 6 then ascends until the upper end surface of the punch tip 63 of the lower punch 6 substantially reaches the level of the upper end of the die bore 4, (i.e., the top surface of the table 31), and pushes a molded product out of the die bore 4 onto the surface of the turret 3. The molded product pushed out of the die bore 4 is brought into contact with the guide member 17 by a rotation of the turret 3, and moves along the guide member 17 to the molded-product collecting position 18.

The molded-product collector of the compression-molding machine has a molded product removal mechanism configured to select a specific molded product such as a sampled product or a defective product from among molded products collected at the molded-product collecting position 18. Specifically, the guide member 17 is provided therein with an air passage 16 for a pressurized air flow, and the air passage 16 has a distal end functioning as an air spray nozzle 16*a* opened outward in the radial direction of the turret 3. A flow passage 20 connects an air feed source (not shown) such as a pump configured to feed pressurized air and the air passage 16, and a control valve 22 is disposed on the flow passage 20 to open and close the flow passage 20. Examples of the control valve 22 include an electromagnetic solenoid configured to open in accordance with a control signal transmitted from the controller C or the like.

If the control valve 22 is opened when a specific molded product pushed out of the die bore 4 passes by the air spray nozzle 16*a* before contacting the guide member 17, then the air spray nozzle 16*a* discharges pressurized air fed from the air feed source through the flow passage 20 and the air passage 16 in the guide member 17. The discharged air blows the specific molded product outward from the table 31. The blown molded product will not reach the molded-product collecting position 18 ahead of the guide member 17. As described above, the molded product removal mechanism W in the compression-molding machine includes the passages 16 and 20 for air fed from the air feed source, the spray nozzle 16a, and the control valve 22.

The molded product removal mechanism W is also configured to sample a tableted molded product.

Described below is a device configured to feed the buffer tank 19 with a powdery material, specifically, a powdery-material feeding device (i.e., powdery material mixing and feeding device) Z configured to deliver the powdery material toward the feed pipe 191 directly connected to the feeder X. As shown exemplarily in FIGS. 4 and 5, the powdery-material feeding device Z according to the exemplary embodiment includes three measuring feeders Z1 (e.g., Z1a, Z1b, and Z1c). The number of measuring feeders Z1 changes depending on the number of types of powdery materials to be mixed. The powdery material-mixing and feeding device Z can include two, four, or more measuring feeders Z1 with no particular limitation in the number thereof.

The first to third measuring feeders Z1a to Z1c according to the exemplary embodiment measure and feed different types of powdery materials. These measuring feeders Z1a to Z1c can alternatively measure and feed a single type of a powdery material. The first measuring feeder Z1a, the second measuring feeder Z1b, and the third measuring feeder Z1c according to the exemplary embodiment can measure and feed a principal agent, a powdery material of an excipient like lactose or the like, and a lubricant, respectively.

Figure 4:
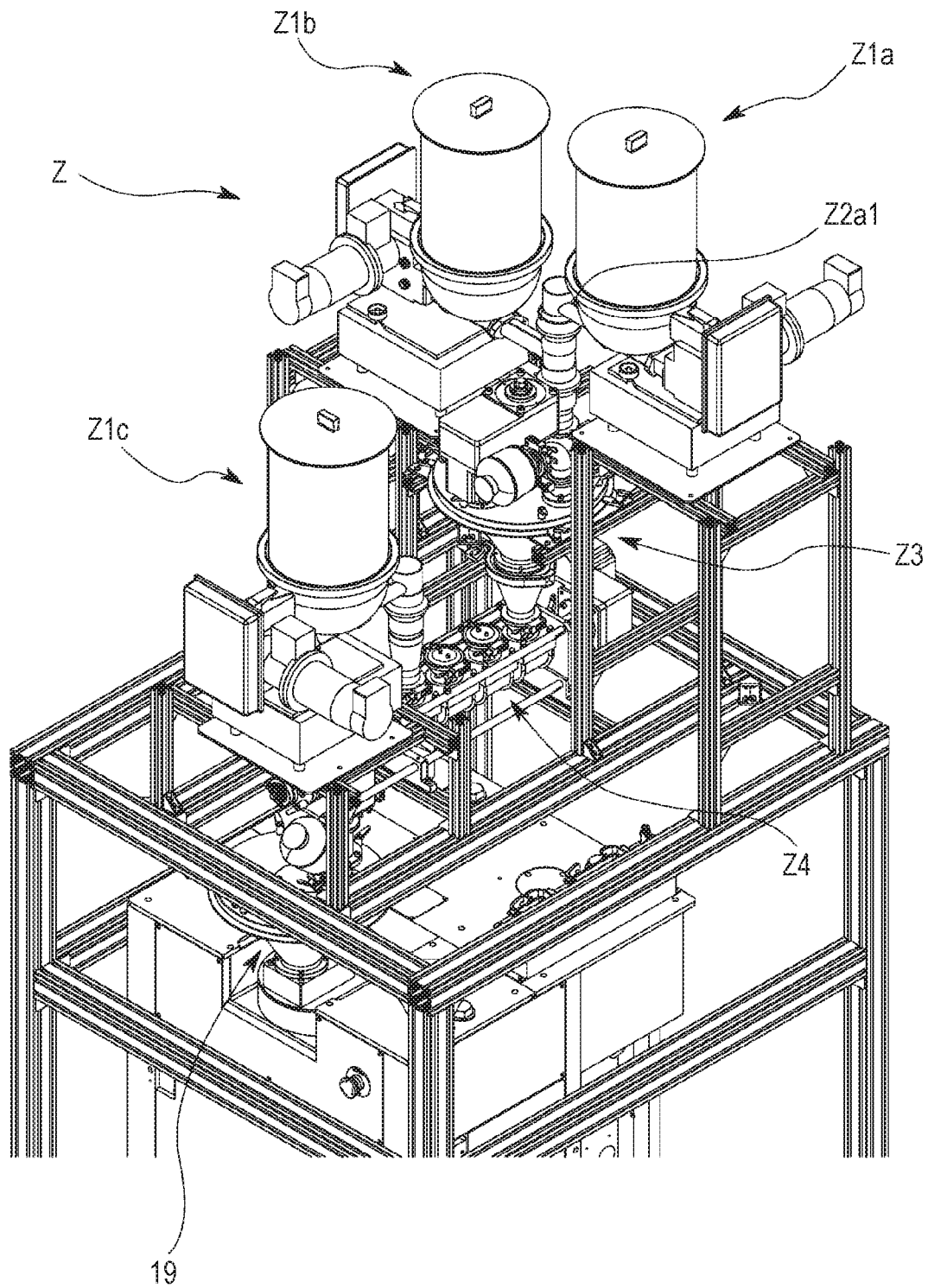
FIG. 4 is a perspective view of a powdery material-mixing and feeding device according to the exemplary embodiment.
Figure 5:
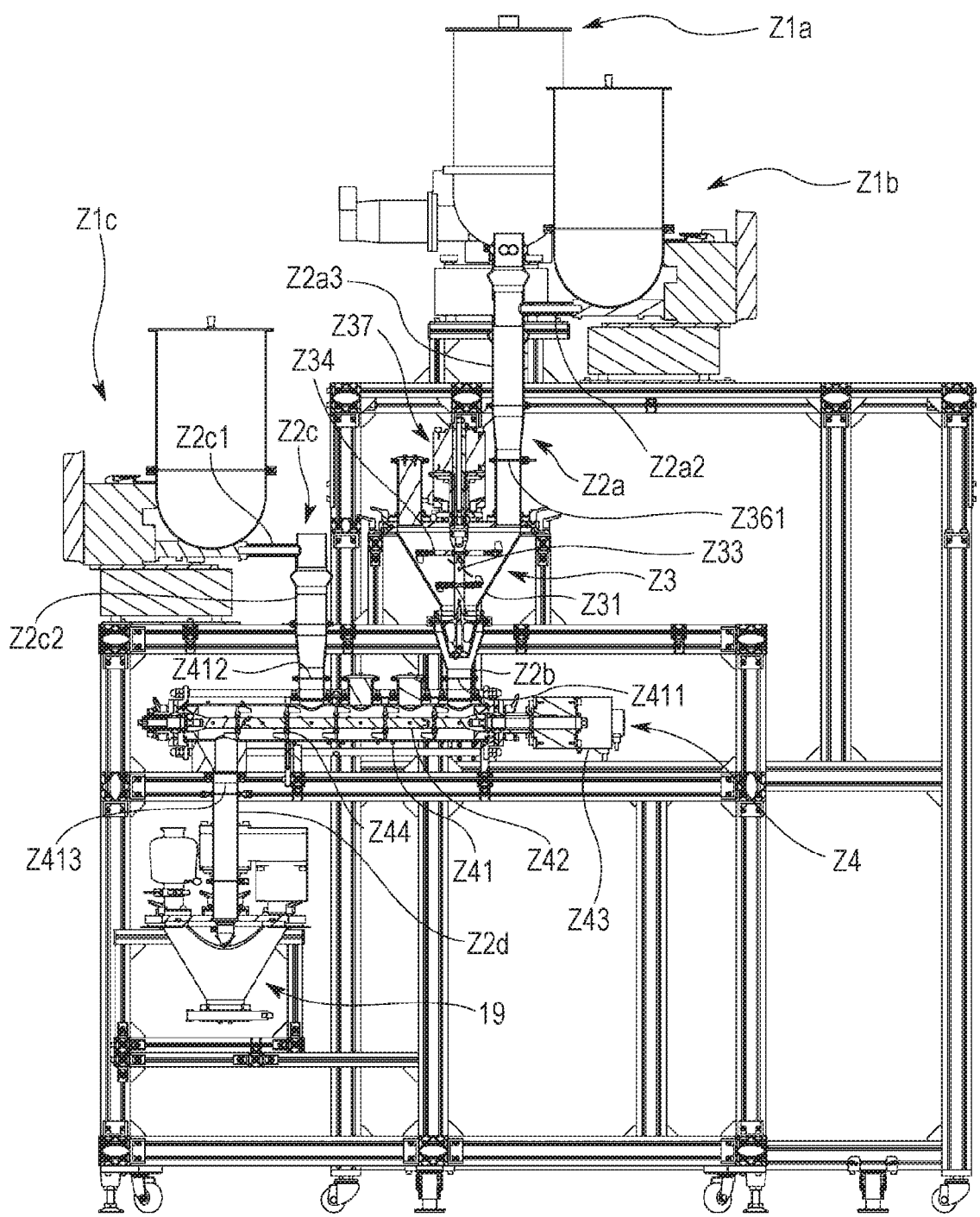
FIG. 5 is a side view of the powdery material-mixing and feeding device according to the exemplary embodiment.
Figure 6:
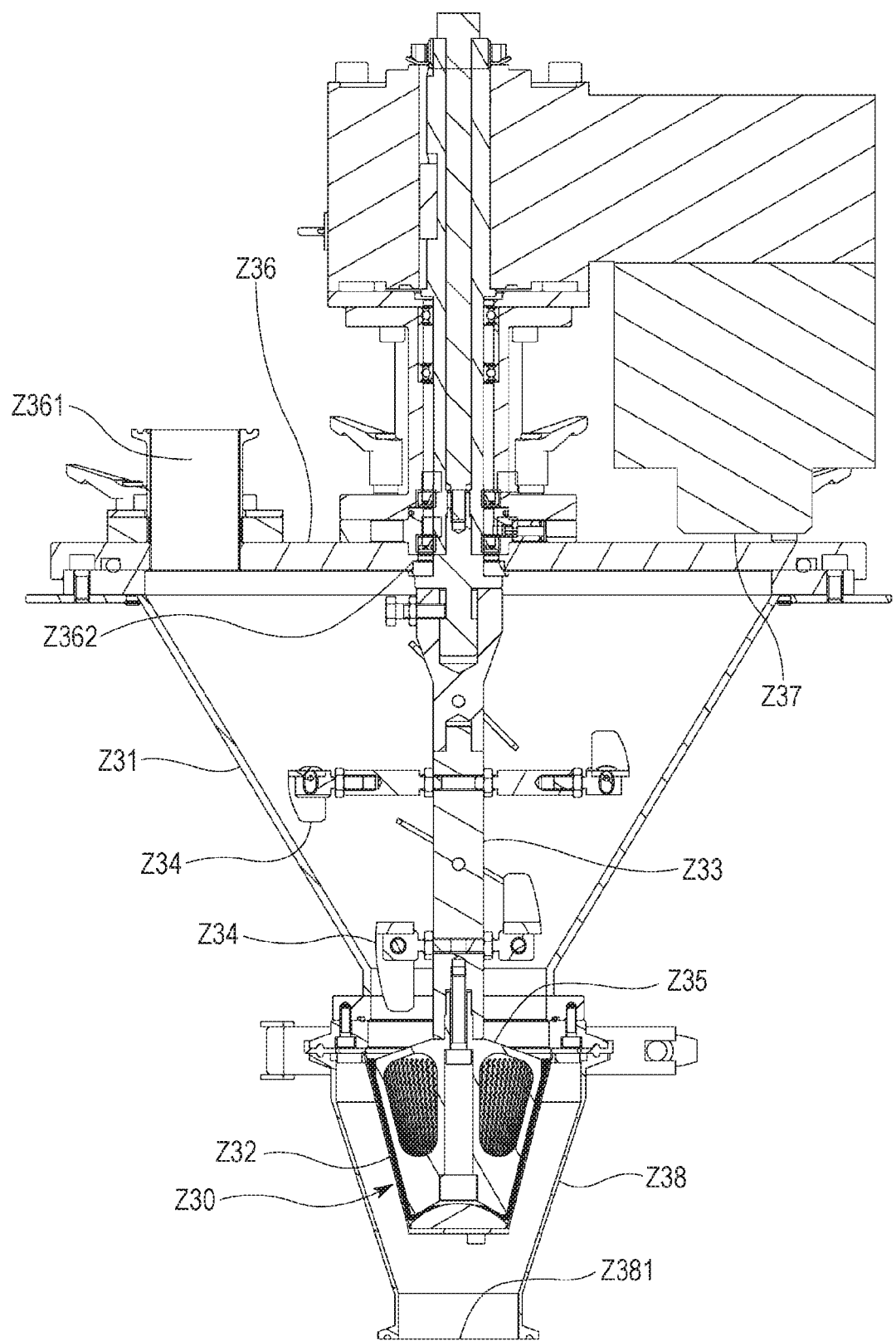
FIG. 6 is a side sectional view of a vertical mixer included in the powdery material-mixing and feeding device according to the exemplary embodiment.

As shown exemplarily in FIGS. 4 and 5, the powdery-material feeding device Z includes the first measuring feeder Z1a, the second measuring feeder Z1b, a vertical mixer Z3 (i.e., a first mixer), a first connecting pipe Z2a connecting the measuring feeders Z1 (e.g., Z1a and Z1b) and the vertical mixer Z3, a horizontal mixer Z4 (i.e., a second mixer), a second connecting pipe Z2b connecting the vertical mixer Z3 and the horizontal mixer Z4, a third connecting pipe Z2c connecting the third measuring feeder Z1c and the horizontal mixer Z4, and a fourth connecting pipe Z2d connecting the horizontal mixer Z4 and the buffer tank 19. FIG. 4 is a perspective view showing a state where the powdery-material feeding device Z is attached to the compression-molding machine. FIG. 5 is a side view of the powdery-material feeding device Z. The measuring feeders (e.g., Z1a, Z1b, and Z1c) can be modified in terms of their disposition, shapes, and the like, and are not limited to the aspect shown exemplarily in FIGS. 4 and 5.

The first measuring feeder Z1a and the second measuring feeder Z1b measure the powdery materials, namely, the principal agent and the excipient or the like, respectively, and simultaneously feed the first connecting pipe Z2a with the powdery materials. The third measuring feeder Z1c measures the powdery material, namely, the lubricant, and simultaneously feeds the third connecting pipe Z2c with the powdery material (i.e., measuring and feeding). These measuring feeders Z1 are configured in accordance with the known loss in weight system (i.e., a loss integrated value system), and each conduct-feedback control of causing weight of a powdery material discharged from the feeder Z1 to be constantly measured with a gravimetric sensor, comparing to find whether or not the weight transitions to achieve a set target discharge flow rate, and increasing or decreasing a discharge rate of the feeder Z1 to reduce a difference between. Measuring the powdery materials to be fed and feeding the connecting pipes Z2a and Z2c with the powdery materials stabilizes contents of the principal agent and the like in a molded product.

As described earlier, the first connecting pipe Z2a connects the first measuring feeder Z1a and the second measuring feeder Z1b to the vertical mixer Z3, and feeds the vertical mixer Z3 with the principal agent discharged from the first measuring feeder Z1a and the excipient or the like discharged from the second measuring feeder Z1b. The second connecting pipe Z2b connects the vertical mixer Z3 and the horizontal mixer Z4, and feeds the horizontal mixer Z4 with the mixed-powdery materials of the principal agent and the excipient discharged from the vertical mixer Z3. The third connecting pipe Z2c connects the third measuring feeder Z1c and the horizontal mixer Z4, and feeds the horizontal mixer Z4 with the lubricant discharged from the third measuring feeder Z1c. The fourth connecting pipe Z2d connects the horizontal mixer Z4 and the buffer tank 19, and feeds the buffer tank 19 with the mixed-powdery materials of the principal agent, the excipient, and the lubricant discharged from the horizontal mixer Z4.

More specifically, the first connecting pipe Z2a includes a first branch pipe Z2a1 connected with the first measuring feeder Z1a, a second branch pipe Z2a2 connected with the second measuring feeder Z1b, and a main pipe Z2a3 connected with the first branch pipe Z2a1 and the second branch pipe Z2a2. The main pipe Z2a3 has a lower end connected with the vertical mixer Z3. The vertical mixer Z3 thus mixes the powdery materials measured and fed by the first measuring feeder Z1a and the second measuring feeder Z1b (i.e., first mixing).

The second connecting pipe Z2b, the third connecting pipe Z2c, and the fourth connecting pipe Z2d will be described later.

As shown exemplarily in FIGS. 5 to 8, the vertical mixer Z3 includes a lid Z36 having a feed port Z361 for a powdery material, a first case Z31 disposed below the lid Z36 and having a funnel shape, an agitation shaft Z33 disposed substantially in the center of the first case Z31 and configured to spin, an agitating rotor Z34 (i.e., first mixing member) attached to the agitation shaft Z33, a motor Z37 configured to rotate (i.e., spin) the agitation shaft Z33, a powdery material passing member Z32 disposed below the first case Z31 and having a plurality of bores Z321, an auxiliary rotor Z35 (i.e., first mixing member) configured to facilitate a powdery material to pass through the bores Z321 of the powdery material passing member Z32, and a second case Z38 covering the powdery material passing member Z32. The agitating rotor Z34 and the auxiliary rotor Z35 each function as the first mixing member. The configuration according to the exemplary embodiment includes both the agitating rotor Z34 and the auxiliary rotor Z35, while the invention is also applicable to another configuration including only one of the agitating rotor Z34 and the auxiliary rotor Z35.

The agitation shaft Z33 of the vertical mixer Z3 is not necessarily disposed vertically but can be slanted. The vertical mixer Z3 has only to be configured to agitate and mix powdery materials while the powdery materials fed from the feed port Z361 are flowing downward.

The powdery materials fed through the feed port Z361 of the vertical mixer Z3 are mixed by rotation of the agitating rotor Z34 (i.e., first mixing). The powdery materials can alternatively be mixed by rotation of the auxiliary rotor Z35.

The lid Z36 includes the feed port Z361 and a shaft port Z362 allowing the agitation shaft Z33 to pass therethrough, and is shaped to cover an upper opening of the first case Z31. The lid Z36 is attached to the first case Z31 so as to prevent a powdery material from spilling or scattering from the first case Z31. The feed port Z361 of the lid Z36 is connected with the first connecting pipe Z2a. The powdery materials fed from the feed port Z361 into the first case Z31 are agitated and mixed by rotation of the agitating rotor Z34 and/or the auxiliary rotor Z35. The powdery material passing member Z32 disposed at a reservoir Z30 has the plurality of bores Z321 through which the mixed-powdery materials pass.

Adjustment in amount of the powdery materials fed from the feed port Z361 or increase in a rotational speed of the auxiliary rotor Z35 can cause the powdery materials fed from the feed port Z361 to be larger in amount than the powdery materials passing through the bores Z321. A certain amount of the powdery materials will thus remain in the reservoir Z30. Specifically, at least part of the powdery materials measured and fed by the first measuring feeder Z1a and the second measuring feeder Z1b remain in the reservoir Z30 in the vertical mixer Z3 (i.e., reserving) and are agitated by the auxiliary rotor Z35, to achieve improvement in mixing degree of the powdery materials. There can be included a plurality of feed ports Z361.

The first case Z31 has the open top and the powdery material passing member Z32 is disposed below the first case Z31. The first case Z31 according to the exemplary embodiment has the substantially funnel shape, while the first case Z31 is not limited to this shape but can have any shape if it is configured to feed the powdery material passing member Z32 with a powdery material.

The agitation shaft Z33 is disposed in the center of the first case Z31 in a planar view and is driven to rotate (i.e., spin) by the motor Z37. The agitating rotor Z34 is attached to each of the top and the center in the axial direction of the agitation shaft Z33, and the auxiliary rotor Z35 is attached to the lower end in the axial direction of the agitation shaft Z33. Rotation of the agitation shaft Z33 rotates the agitating rotors Z34 and the auxiliary rotor Z35.

Figure 8:
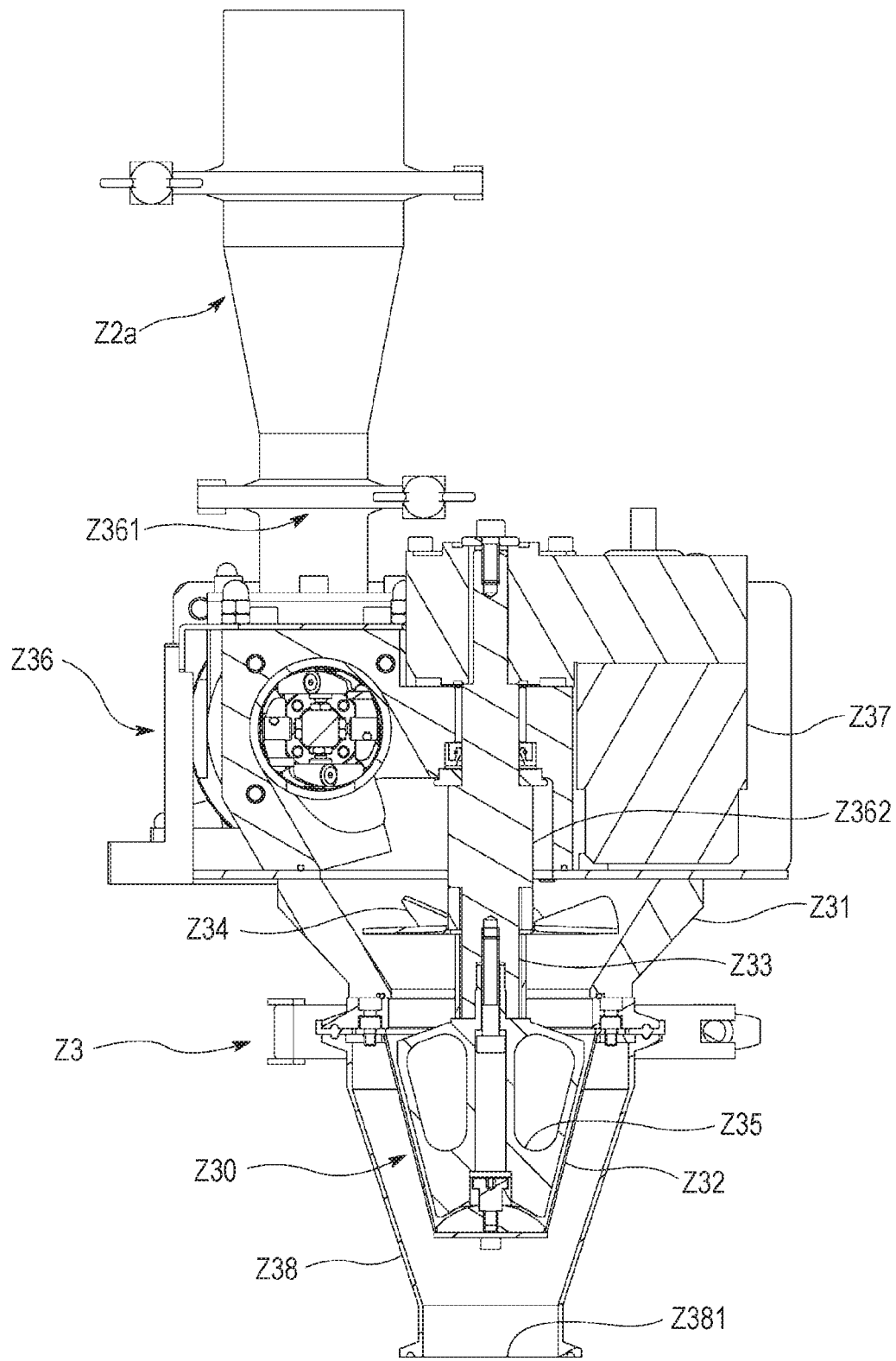
FIG. 8 is a side sectional view of another exemplary vertical mixer.

The agitating rotors Z34 (i.e., first mixing members) agitate and mix the powdery materials fed from the feed port Z361 into the first case Z31. The agitating rotors Z34 can have any shape. The agitating rotors Z34 shown exemplarily in FIGS. 5 and 6 have a rectangular distal end and are disposed at two positions on the agitation shaft Z33. The vertical mixer Z3 shown exemplarily in FIG. 8 is configured partially differently from the vertical mixer Z3 shown exemplarily in FIGS. 5 and 6. The vertical mixer Z3 shown exemplarily in FIG. 8 includes the agitating rotor Z34 disposed at a single position on the agitation shaft Z33 and shaped differently from the agitating rotors Z34 shown exemplarily in FIGS. 5 and 6. The agitating rotors Z34 are not limited in terms of their shapes or positions to those shown exemplarily in FIGS. 5, 6, and 8.

Figure 7:
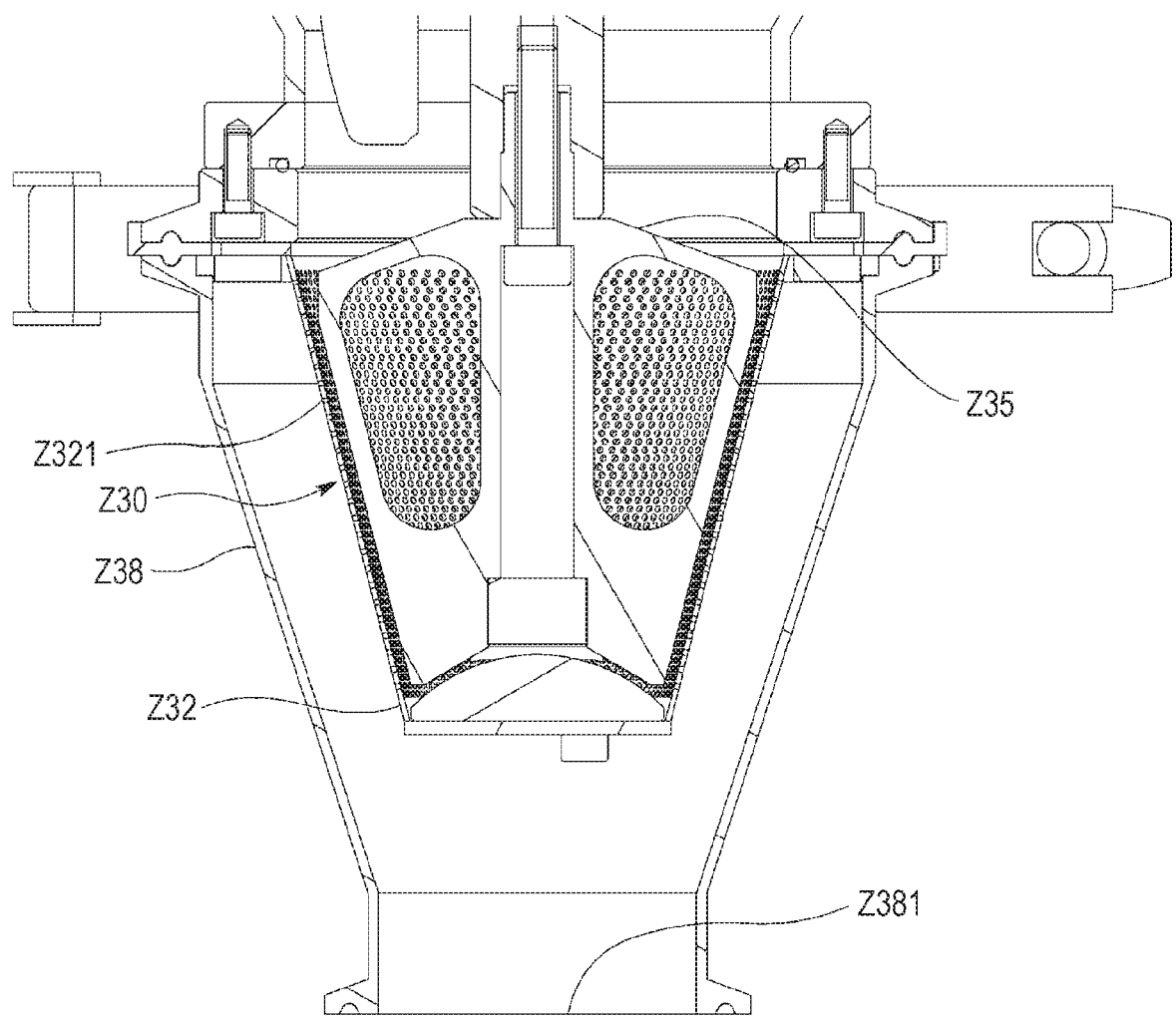
FIG. 7 is an enlarged side sectional view of a main part of the vertical mixer according to the exemplary embodiment.

As shown exemplarily in FIG. 7, the powdery material passing member Z32 at the reservoir Z30 is disposed below the first case Z31 and includes the plurality of bores Z321. The powdery material passing member Z32 is covered with the second case Z38. A powdery material passing through the bores Z321 of the powdery material passing member Z32 is discharged from a discharge port Z381 disposed at the bottom of the second case Z38. The number and the diameter of the bores Z321 are set appropriately. Such a configuration allows powdery materials to remain at the powdery material passing member Z32 and achieves improvement in mixing degree of the powdery materials. A powdery material passing through the bores Z321 of the powdery material passing member Z32 in a first vertical mixer Z34 is fed to the horizontal mixer Z4 by way of the second connecting pipe Z2b.

The auxiliary rotor Z35 agitates a powdery material in the reservoir Z30. The auxiliary rotor Z35 is disposed in the center of the reservoir Z30 in a planar view and is attached to the lower end of the agitation shaft Z33. The auxiliary rotor Z35 according to the exemplary embodiment is shaped to follow the inner shape of the powdery material passing member Z32 and facilitates a powdery material to pass through the bores Z321. The auxiliary rotor Z35 is also configured as a type of an agitating rotor.

The vertical mixer Z3 according to the exemplary embodiment includes the agitating rotor Z34. The vertical mixer Z3 can alternatively be configured by the second case Z38, the powdery material passing member Z32, and the auxiliary rotor Z35. The second case Z38 covers the powdery material passing member Z32, has a substantially funnel shape, and has the discharge port Z381 at the bottom. The second case Z38 guides a powdery material passing through the bores Z321 of the powdery material passing member Z32 to the discharge port Z381.

The second connecting pipe Z2b connects the vertical mixer Z3 and the horizontal mixer Z4 to be described later. The second connecting pipe Z2b is connected to the bottom of the vertical mixer Z3 and the top of the horizontal mixer Z4, and feeds the horizontal mixer Z4 with the powdery materials passing through the discharge port Z381 of the vertical mixer Z3.

As shown exemplarily in FIG. 5, the horizontal mixer Z4 functioning as the second mixer includes a cylindrical case Z41, an agitation shaft Z42 disposed substantially in the center of the case Z41 and configured to spin, a motor Z43 configured to rotate (i.e., spin) the agitation shaft Z42, and an agitating rotor Z44 attached to the agitation shaft Z42 and configured to rotate to move a powdery material substantially horizontally. The horizontal mixer Z4 mixes the fed powdery materials, namely, the principal agent and the excipient or the like with the lubricant (i.e., second mixing). The case Z41 according to the exemplary embodiment does not rotate (i.e., spin), but can alternatively be configured to rotate. This will achieve further improvement in mixing degree of the powdery materials.

The case Z41 has a top including a plurality of feed ports that allows powdery materials to be fed into the case Z41, and a discharge port Z413 that allows mixed-powdery materials to be discharged from the case Z41. The configuration according to the exemplary embodiment includes two feed ports (e.g., first and second feed ports Z411 and Z412), and the second connecting pipe Z2b is connected to the first feed port Z411 of the case Z41 of the horizontal mixer Z4. The first feed port Z411 feeds the case Z41 with the mixed-powdery materials of the principal agent and the excipient or the like. The agitating rotor Z44 rotates to move the mixed-powdery materials fed into the case Z41 toward the discharge port Z413 of the case Z41. The second feed port Z412 feeds the lubricant from the third connecting pipe Z2c. The agitation shaft Z42 and the agitating rotor Z44 rotate to move the lubricant fed into the case Z41 toward the discharge port Z413 of the case Z41. Any of the feed ports not in use will be closed by a lid.

The discharge port Z413 is disposed at the bottom of the case Z41. The discharge port Z413 is connected with the fourth connecting pipe Z2d to be described later. The agitating rotor Z44 rotates to discharge the mixed-powdery materials from the case Z41 through the discharge port Z413 to the fourth connecting pipe Z2d.

Figure 9:
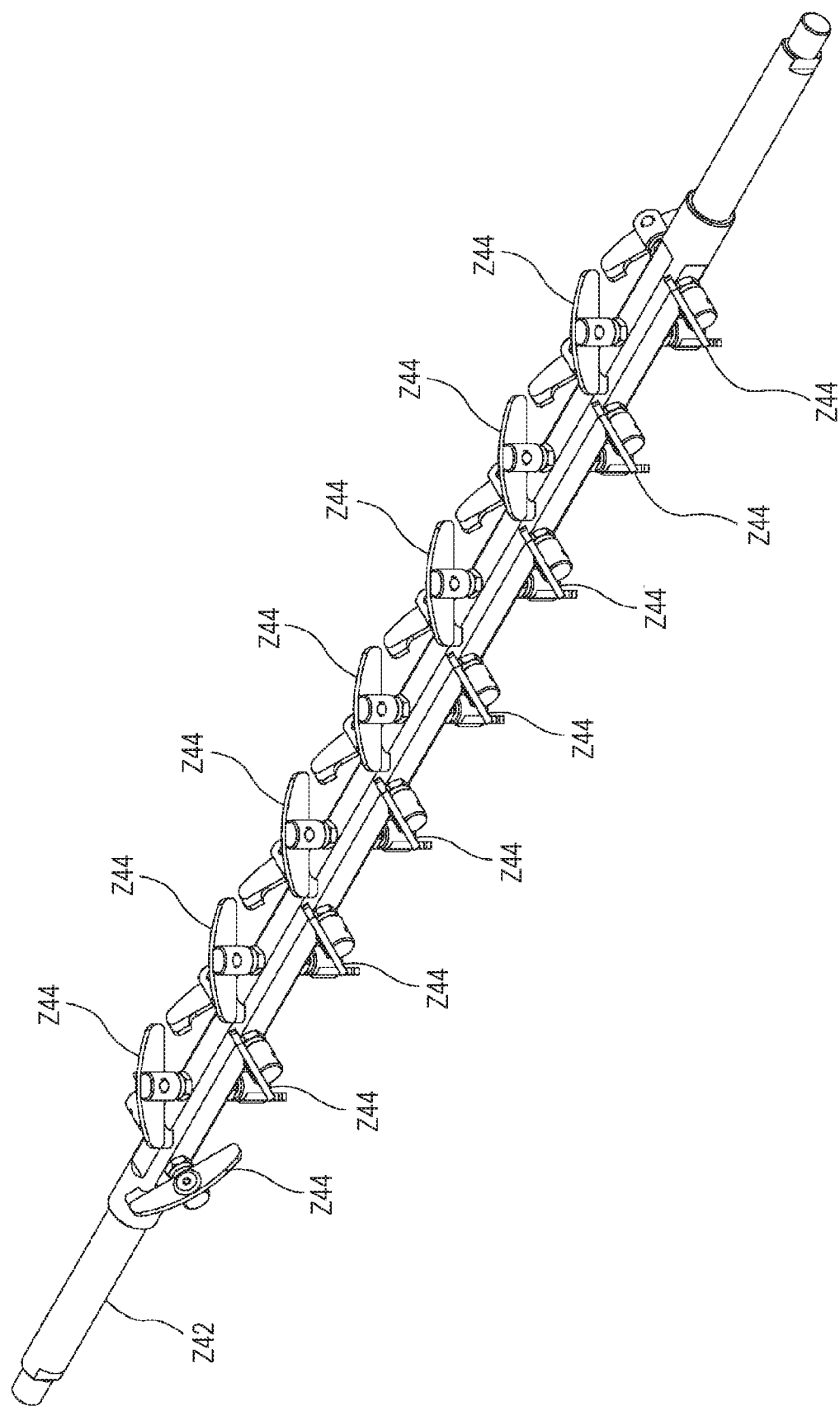
FIG. 9 is a perspective view of an agitation shaft and an agitating rotor (second mixing member) of a horizontal mixer included in the powdery material-mixing and feeding device according to the exemplary embodiment.

The agitation shaft Z42 extends in a longitudinal direction of the case Z41 and is disposed substantially in the center in a sectional view. The agitation shaft Z42 is driven to rotate (i.e., spin) by the motor Z43. As shown exemplarily in FIG. 9, the agitating rotor Z44 is attached to the agitation shaft Z42. Rotation of the agitation shaft Z42 causes rotation of the agitating rotor Z44 to simultaneously mix and move the powdery materials toward the discharge port Z413.

The agitating rotor Z44 is configured to agitate and mix the powdery materials fed into the case Z41 through the feed ports (e.g., Z411 and Z412). The agitating rotor Z44 can have any shape, but is preferably configured to simultaneously mix and move the powdery materials toward the discharge port Z413. As shown exemplarily in FIG. 9, the agitating rotor Z44 according to the exemplary embodiment is shaped to have both expanded ends, and is attached to the agitation shaft Z42 at a freely adjustable angle.

The third measuring feeder Z1c is configured to measure and feed a lubricant to the horizontal mixer Z4. The third connecting pipe Z2c is connected to the bottom of the third measuring feeder Z1c. The lubricant in the third measuring feeder Z1c is fed to the horizontal mixer Z4 through the third connecting pipe Z2c (i.e., lubricant feeding). The lubricant can alternatively be fed to the horizontal mixer Z4 by a μR feeder. The lubricant can still alternatively be fed to the horizontal mixer Z4 by an atomizer or a spray device.

The third connecting pipe Z2c includes a branch pipe Z2c1 and a main pipe Z2c2. The branch pipe Z2c1 has a first end connected to the bottom of the third measuring feeder Z1c, and a second end connected to the main pipe Z2c2. The lower end of the main pipe Z2c2 is connected to the second feed port Z412 of the horizontal mixer Z4.

The fourth connecting pipe Z2d has an upper end connected with the discharge port Z413 of the horizontal mixer Z4 and a lower end connected with a feed port of the buffer tank 19. The mixed-powdery materials are fed through the discharge port Z413 of the horizontal mixer Z4 and the fourth connecting pipe Z2d to the buffer tank 19.

The bottom of the buffer tank 19 is connected to the compression-molding machine. The mixed-powdery materials passing through the buffer tank 19 are fed to the feeder X in the compression-molding machine and are eventually compression molded in the die bores 4.

The powdery material mixing degree measurement device M measures the mixing degree of the mixed-powdery materials discharged from the buffer tank 19 of the powdery-material feeding device Z toward the compression-molding machine. If the mixing degree is out of a predetermined range, the mixed-powdery materials are discharged, alarm sound is issued, then the device is stopped, or the like. The powdery material mixing degree measurement device M promptly measures the mixing degree of the powdery materials mixed by the powdery-material feeding device Z and operates appropriately.

Examples of a method of measuring a mixing degree of mixed-powdery materials include Raman spectroscopy, infrared spectroscopy, X-ray diffraction, X-ray transmission measurement, and high performance liquid chromatography (HPLC). Any one of these methods is applicable to promptly measure a mixing degree of mixed-powdery materials. The exemplary embodiment mainly adopts near infrared reflectance (NIR), or a near infrared absorption spectrum method. Specifically, in order to evaluate an amount or a percentage (i.e., ratio) of the principal agent in the mixed-powdery materials (i.e., uniformity of the mixed-powdery materials) (whether or not the mixed-powdery materials are segregated), the mixed-powdery materials moving from the powdery-material feeding device Z toward the feeder X of the compression-molding machine are irradiated with near infrared light to measure light absorption and scattering for qualitative and quantitative analyses of a concentration and the like of the principal agent based on a spectrum. These analyses are repeatedly conducted at predetermined cycles. A measured wavelength falls in a wavelength range including a unique absorption peak of the principal agent and no peak of the excipient or the lubricant. The near infrared reflectance also achieves measurement of particle diameters of the mixed-powdery materials.

The exemplary embodiment adopts a near infrared sensor as a process analytical technology (PAT) sensor configured to measure a mixing degree and the like of powdery materials. As shown exemplarily in FIGS. 10 and 11, the configuration according to the exemplary embodiment includes a first sensor S1 of a near infrared sensor configured to initially measure the mixing degree of the mixed-powdery materials before being reserved in the buffer tank 19.

The powdery materials mixed by the powdery-material feeding device Z are temporarily reserved in the buffer tank 19 as a reservoir after the first sensor S1 measures the mixing degree of the powdery materials. The powdery materials reserved in the buffer tank 19 are fed to the powdery material mixing degree measurement device M after a near infrared sensor S2 measures the mixing degree of the powdery materials again. The mixed-powdery materials can optionally be further agitated and mixed in the buffer tank 19.

Figure 12:
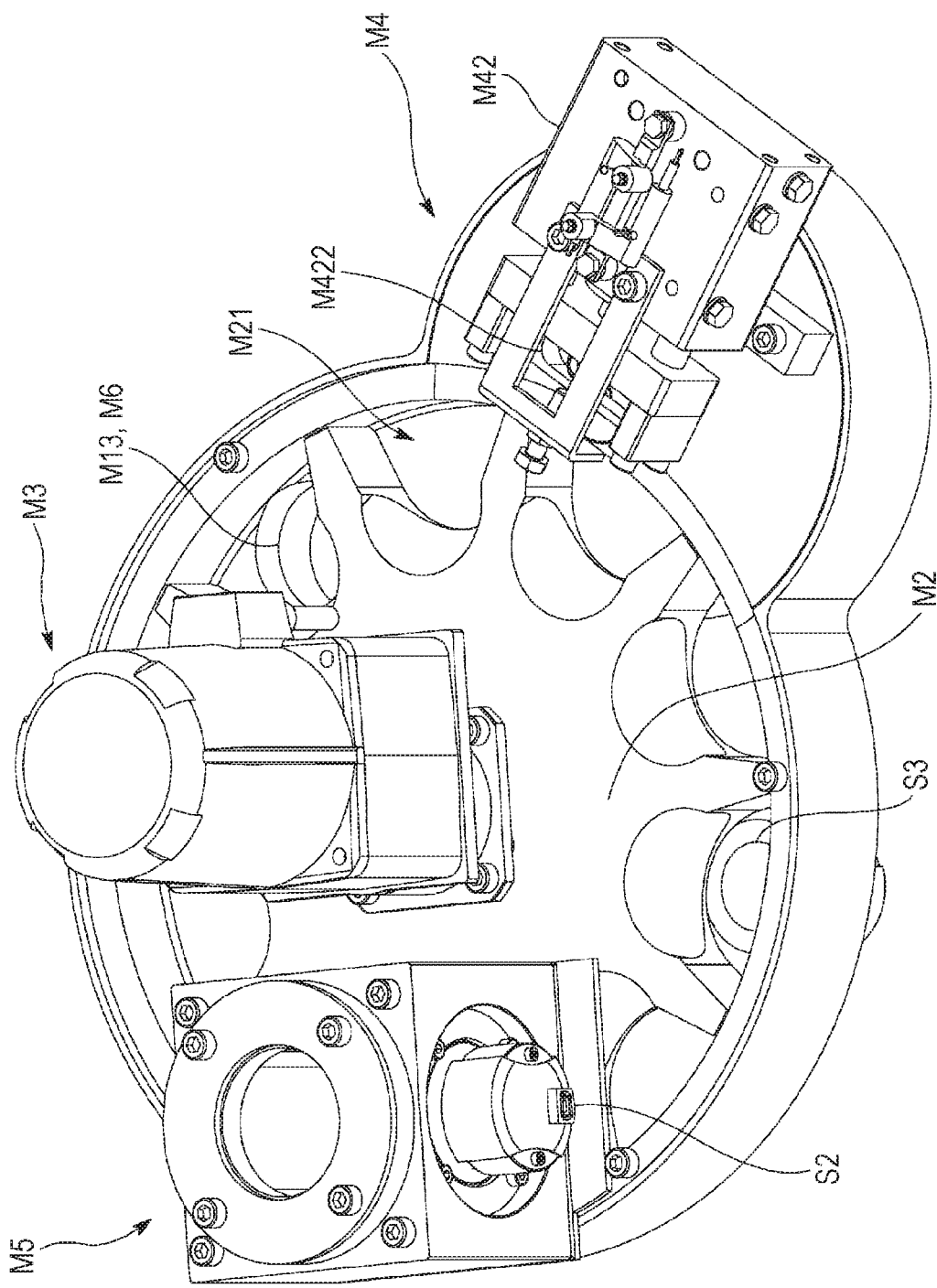
FIG. 12 is a perspective view of a main part of a powdery material mixing degree measurement device according to the exemplary embodiment.
Figure 13:
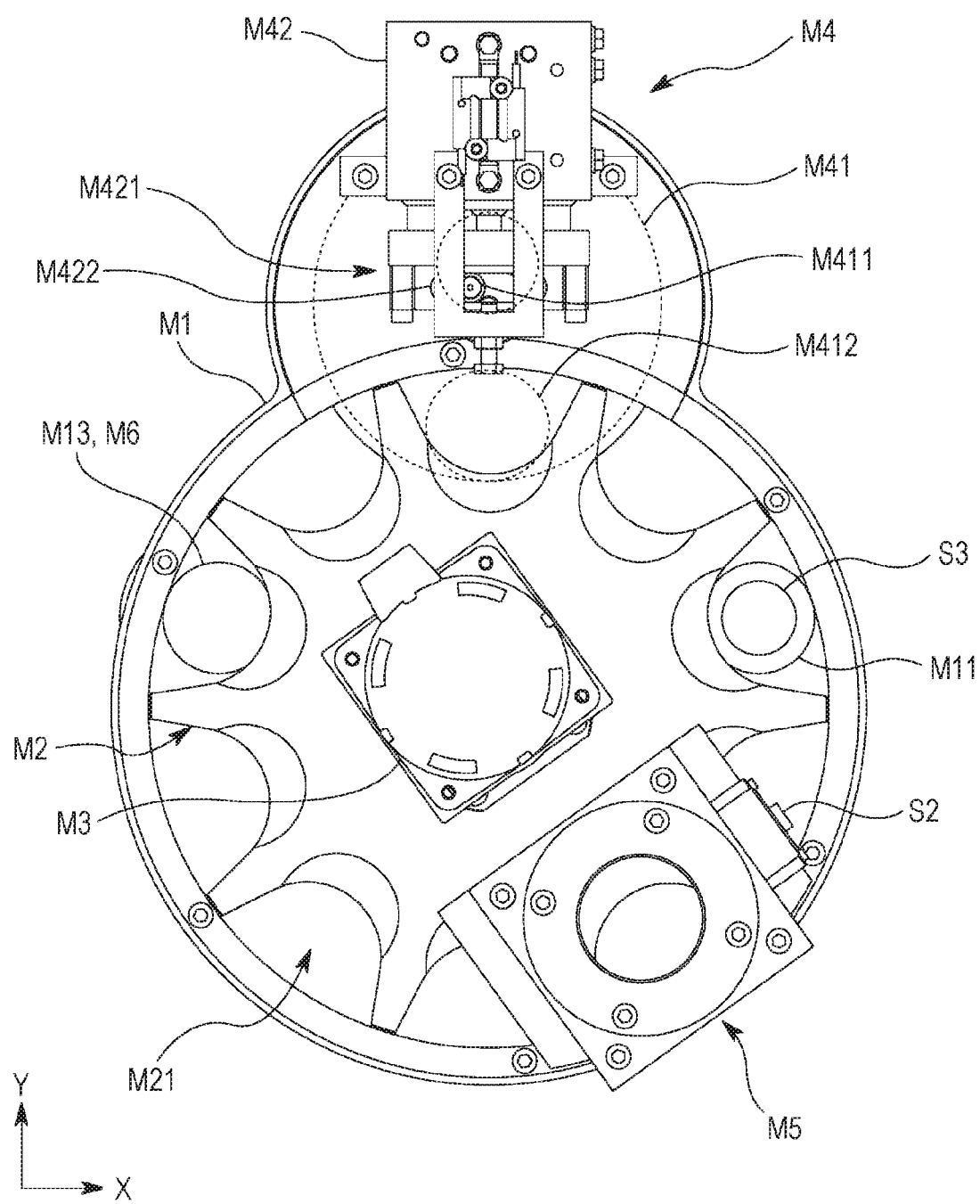
FIG. 13 is a plan view of the main part of the powdery material mixing degree measurement device according to the exemplary embodiment.

As shown exemplarily in FIGS. 12 and 13, the powdery material mixing degree measurement device M includes a case M1, a rotator M2 as a movable member in the case M1, a motor M3 as a driver for the rotator M2, near infrared sensors S2 and S3 configured to measure a mixing degree of powdery materials, a powdery-material remover M4 configured to remove defective mixed-powdery materials, the feeding unit M5 configured to introduce the mixed-powdery materials from the buffer tank 19 into the case M1, and the discharger M6 configured to discharge the mixed-powdery materials to the agitated feeder X functioning as a filling device of the compression-molding machine.

Figure 14:
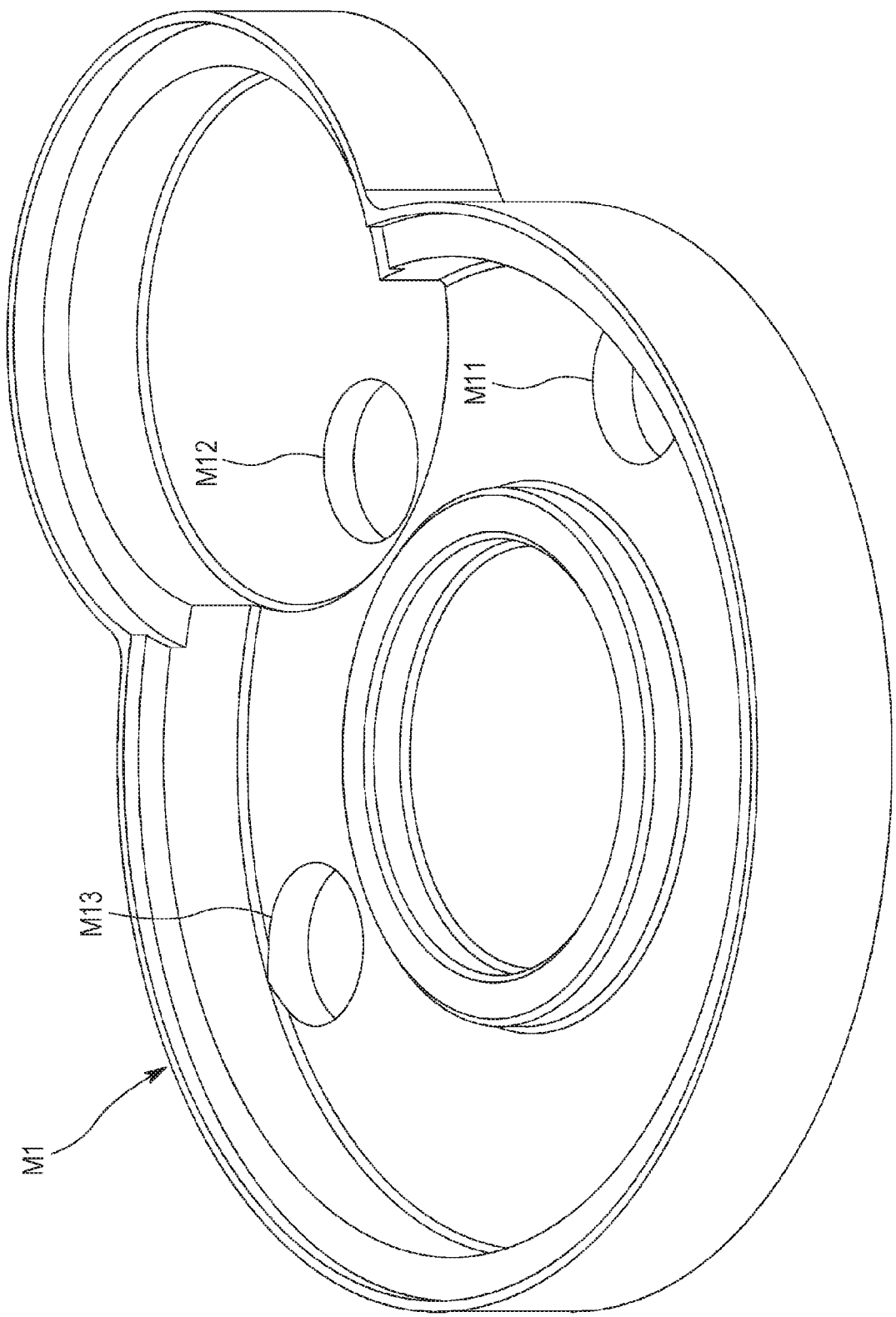
FIG. 14 is a perspective view of a case of the powdery material mixing degree measurement device according to the exemplary embodiment.
Figure 15:
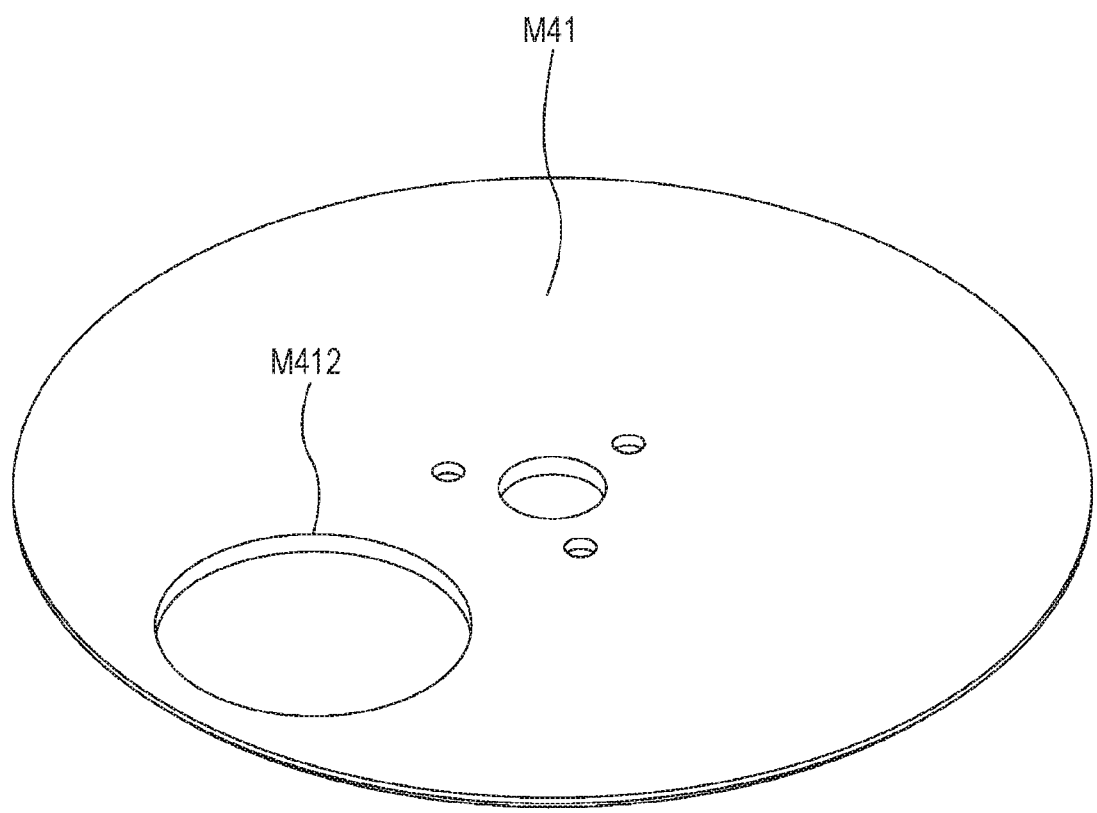
FIG. 15 is a perspective view of a drive body of the powdery material mixing degree measurement device according to the exemplary embodiment.

As shown exemplarily in FIG. 14, the case M1 has a bottom surface including an attachment bore M11 allowing the near infrared sensor S3 to be mounted therein, a removal bore M12 (e.g., the powdery-material remover M4) for removal of a powdery material, and a discharge bore M13 (e.g., the discharger M6) for discharge of a powdery material to the powdery-material feed pipe 191. The case M1 has a top surface on which the feeding unit M5 configured to feed the case M1 with a powdery material is mounted. The mixed-powdery materials enter the case M1 by way of the buffer tank 19 and the feeding unit M5. The feeding unit M5 has the second sensor S2 of a near infrared sensor configured to measure a mixing degree of mixed-powdery materials passing through the feeding unit M5.

The rotator M2 includes a plurality of movable portions M21. The feeding unit M5 feeds the movable portions M21 with the mixed-powdery materials. The rotator M2 is driven to rotate by the motor M3 positioned above the rotator M2.

The third sensor S3 of a near infrared sensor is attached to the attachment bore M11 of the case M1 and is configured to measure a mixing degree of powdery materials fed to the movable portions M21.

The powdery-material remover M4 includes a case, a drive body M41, and a driver M42 configured to drive the drive body M41. The case of the powdery-material remover M4 is provided integrally with the case M1. The drive body M41 according to the exemplary embodiment has a circular disc shape, and includes a center projection M411 engaged with the driver M42, and a partial cutoff portion M412. The driver M42 has a distal end M421 configured to drive forward and backward along a Y axis indicated in FIG. 13, and an engagement bore M422 disposed at the distal end and engaged with the projection M411 of the drive body M41.

In a state where the distal end M421 of the driver M42 moves in a positive direction along the Y axis as indicated in FIG. 13, the cutoff portion M412 of the drive body M41 is located in the center of the removal bore M12 of the case M1. In another state where the distal end M421 moves in a negative direction along the Y axis, the cutoff portion M412 is apart from the removal bore M12 of the case M1.

Specifically, in the case where the driver M42 drives to move the distal end M421 in the negative direction along the Y axis, the drive body M41 is driven clockwise together therewith and the cutoff portion M412 is not overlapped with the removal bore M12. A powdery material in the movable portions M21 of the rotator M2 is not removed in this case. In the other case where the driver M42 drives to move the distal end M421 in the positive direction along the Y axis, the drive body M41 is driven counterclockwise together therewith and the cutoff portion M412 is overlapped with the removal bore M12. The powdery material in the movable portions M21 of the rotator M2 is removed in this case.

The drive body M41 according to the exemplary embodiment is driven clockwise and counterclockwise to remove the powdery material in the movable portions M21 of the rotator M2. The drive body M41 can alternatively be configured to rotate only in one direction to remove the powdery material in the movable portions M21.

If the mixing degree of the powdery materials measured with any of the first to third sensors S1 to S3 (i.e., the amount or the percentage (i.e., ratio) of the principal agent in the mixed-powdery materials, is out of the predetermined range), then the powdery-material remover M4 removes the mixed-powdery materials in the movable portions M21. The mixed-powdery materials in the movable portions M21 can alternatively be removed if all mixing degree measurement values of the first to third sensors S1 to S3 are out of the predetermined range, or if the measurement value of any one of the sensors S is out of the predetermined range.

The powdery-material remover M4 is also configured to sample the mixed-powdery materials.

The mixed-powdery materials not removed by the powdery-material remover M4 pass through the discharge bore M13 to reach the powdery-material feed pipe 191. The mixed-powdery materials move to the discharger M6 in this case.

A fourth sensor S4 of a near infrared sensor measures the mixing degree of the mixed-powdery materials reached the powdery-material feed pipe 191 before the mixed-powdery materials are guided into the agitated feeder X functioning as a filling device of the compression-molding machine. Furthermore, a fifth sensor S5 of a near infrared sensor measures the mixing degree of the mixed-powdery materials in the agitated feeder X of the compression-molding machine according to the exemplary embodiment.

If the mixing degree of the mixed-powdery materials measured by the fourth sensor S4 and/or the fifth sensor S5 is out of the predetermined range, then the mixed-powdery materials in the feeder X are once filled in each of the die bores 4 of the table 31 of the compression-molding machine and are compression molded by the upper and lower punches 5 and 6 into the shape of a molded product. The molded product is then removed by the molded product removal mechanism W before reaching the molded-product collecting position 18. Specifically, in the compression-molding machine, the control valve 22 is opened when the die bore 4 filled with defective mixed-powdery materials tableted into a molded product passes by the air spray nozzle 16a, and the air spray nozzle 16a sprays air to blow the molded product out of the table 31.

In summary, the powdery-material remover M4 removes the mixed-powdery materials if any of the first to third sensors S1 to S3 detests a mixing degree of the mixed-powdery materials out of the predetermined range, and the molded product removal mechanism W removes the compression-molded mixed powdery materials if the fourth sensor S4 and/or the fifth sensor S5 detects a mixing degree of the mixed-powdery materials out of the predetermined range.

The molded product removal mechanism W removes a molded-product compression molded in any of the die bores 4 also in a case where any of the load cells 25 mounted to the molding machine detects that compression pressure applied to the powdery material compressed in the die bore 4 is out of a predetermined range.

Summarized again below is a flow of continuous production of compression molded products by the system according to the exemplary embodiment. Initially, the first measuring feeder Z1a simultaneously measures and feeds the principal agent, and the second measuring feeder Z1b simultaneously measures and feeds the excipient or the like (measuring and feeding). The vertical mixer Z3 functioning as the first mixer is subsequently fed with the powdery materials of the principal agent and the excipient or the like and mixes the powdery materials therein (i.e., first mixing). In the vertical mixer Z3, the agitating rotor Z34 rotates about the agitation shaft Z33 disposed substantially vertically, to mix the powdery materials of the principal agent and the excipient or the like.

The horizontal mixer Z4 functioning as the second mixer is fed with the mixed-powdery materials of the principal agent and the excipient or the like subjected to the first mixing and mixes the powdery materials again (i.e., second mixing). In the horizontal mixer Z4, the agitating rotor Z44 rotates about the agitation shaft Z42 disposed substantially horizontally, to mix the powdery materials of the principal agent and the excipient or the like. Such a process achieves improvement in mixing degree of the at least two types of powdery materials (e.g., the principal agent and the excipient or the like), and causes less segregation of the principal agent. Third mixing of feeding another vertical mixer with the powdery materials and mixing the powdery materials therein can optionally be conducted after the second mixing by the horizontal mixer Z4. This will achieve further improvement in mixing degree of the powdery materials.

The first mixing preferably includes reserving at least part of the powdery materials. Specifically, the powdery materials pass through the plurality of bores Z321 of the powdery material passing member Z32. The reservoir Z30 reserves powdery materials by increase in amount of the powdery materials to be fed to the first vertical mixer Z3a to be more than the powdery materials passing through the bores Z321 or increase in a rotational speed of the auxiliary rotor Z35. The powdery materials then pass through the bores Z321 while being agitated and mixed by the auxiliary rotor Z35.

Furthermore, the third measuring feeder Z1c simultaneously measures and feeds the lubricant (i.e., lubricant feeding). The lubricant is fed to the horizontal mixer Z4 in the exemplary embodiment, but can alternatively be fed to a second vertical mixer Z3b, the feeder X, or the like, with no limitation in feeding destination of the lubricant to the horizontal mixer Z4.

The mixed-powdery materials including the principal agent, the excipient or the like, and the lubricant are fed to the buffer tank 19 of the compression-molding machine. The sensors S2 or S3 then measures the mixing degree of the mixed-powdery materials fed to the buffer tank 19 (i.e., measuring). Obviously, the sensor S1 can measure the mixing degree of the mixed-powdery materials before the mixed-powdery materials are fed to the buffer tank 19.

The mixed-powdery materials are removed if the measured mixing degree of the mixed-powdery materials is out of the predetermined range (i.e., removing). The mixed-powdery materials are subsequently fed to the feeder X functioning as a filling device. The sensor S5 can measure the mixing degree of the mixed-powdery materials in the feeder X, or the sensor S4 can measure the mixing degree of the mixed-powdery materials immediately before the mixed-powdery materials are fed to the feeder X.

The mixed-powdery materials fed to the feeder X are filled in the die bore 4 of the table 31 of the turret 3 in the compression-molding machine (i.e., filling). As already described, prior to filling with the powdery materials, the lubricant can optionally be sprayed to the inner circumferential surface of the die bore 4, the upper end surface of the lower punch 6, and the lower end surface of the upper punch 5 (i.e., external lubricant spraying). The mixed-powdery materials filled in each of the die bores 4 are compression molded by the upper and lower punches 5 and 6 (i.e., compression molding). The mixed-powdery materials thus compression molded into a molded product are guided by the guide member 17 and are collected at the molded-product collecting position 18. The controller C in the system causes the fourth sensor S4 and/or the fifth sensor S5 to repeatedly measure the mixing degree of the mixed-powdery materials fed by the powdery-material feeding device Z to the feeder X and filled in the die bores 4. If the measured mixing degree of the mixed-powdery materials is out of the predetermined range, then the molded product removal mechanism W in the compression-molding machine removes a defective molded product compression molded in the die bore 4 filled with the mixed-powdery materials (i.e., molded product removing).

The controller C further causes the load cells 25 to measure a compression pressure applied from the punches 5 and 6 to the powdery material in each of the die bores 4 to obtain a molded product. The controller C causes the molded product removal mechanism W to remove a defective molded product compression molded in the die bore 4 having compression pressure out of the predetermined range (i.e., molded product removing). In a case where the powdery material filled in the die bore 4 is more than an appropriate amount, compression pressure measured by the load cell 25 exceeds the predetermined range. In another case where the powdery material filled in the die bore 4 is less than the appropriate amount, compression pressure measured by the load cell 25 is less than the predetermined range. In either one of the cases, the molded product compression molded in the die bore 4 has weight, density, and hardness different from desired values and is regarded as defective.

When the die bore 4 assumed to be filled with such defective mixed-powdery materials having a mixing degree out of the predetermined range or the die bore 4 receiving compression pressure out of the predetermined range (i.e., the possibly defective molded product), passes by the air spray nozzle 16a is found by referring to an output signal from the rotary encoder 23.

The first measuring feeder Z1a is configured to feedback control weight (i.e., a flow rate) of the fed principal agent per unit time, the second measuring feeder Z1b is configured to feedback control weight of the fed excipient or the like per unit time, and the third measuring feeder Z1c is configured to feedback control weight of the fed lubricant per unit time. Furthermore, these powdery materials are to be mixed at a desired mixture ratio. Even in this configuration, the amounts of the powdery materials discharged from the measuring feeders Z1 and fed to the mixers Z3 and Z4 can somehow deviate from initial target amounts. The powdery material fed from any of the measuring feeders Z1 to the mixer Z3 or Z4 is sometimes smaller than the target amount. In such a case, the amount of the principal agent in the mixed-powdery materials has a ratio larger or smaller than the desired ratio. A molded product obtained by compression molding such mixed-powdery materials is defective, failing to exert an expected drug effect.

Even if the mixer Z3 or Z4 fails to adequately mix the powdery materials and the mixed-powdery materials fed to the feeder X of the compression-molding machine have segregation of the principal agent or the excipient, molded products will be defective with different contents.

In view of this, the controller C in the system adjusts, in accordance with the mixing degree measurement value of the mixed-powdery materials by any of the first to fifth sensors S1 to S5, the amounts of the powdery materials fed by the measuring feeders Z1a to Z1c, rotational speed of the agitation shaft Z33, the agitating rotor Z34, and the auxiliary rotor Z35 of the vertical mixer Z3, and a rotational speed of the agitation shaft Z42 and the agitating rotor Z44 of the horizontal mixer Z4.

In a case where the absolute value of a difference between a target value and the amount or the percentage of the principal agent in the mixed-powdery materials repeatedly measured by any of the first to fifth sensors S1 to S5 is more than a predetermined threshold (i.e., the percentage of the principal agent is inappropriately small or large) continuously for at least a certain period, at least one of the first to third measuring feeders Z1a to Z1c is regarded as failing to feed an appropriate amount of the powdery materials. In this case, the controller C temporarily interrupts weight feedback control by the measuring feeder Z1 itself and adjusts a rotational speed of a drive motor of each of the measuring feeders Z1 such that the amount or the percentage of the principal agent in the mixed-powdery materials measured by any of the first to fifth sensors S1 to S5 is approximate to the target value. In a case where the measured amount or the measured percentage of the principal agent in the mixed-powdery materials is less than the target value, the first measuring feeder Z1a increases the amount of the discharged principal agent, and/or the second measuring feeder Z1b decreases the amount of the discharged excipient or the like and the third measuring feeder Z1c decreases the amount of the discharged lubricant. In another case where the measured amount or the measured percentage of the principal agent in the mixed-powdery materials is more than the target value, the first measuring feeder Z1a decreases the amount of the discharged principal agent, and/or the second measuring feeder Z1b increases the amount of the discharged excipient or the like and the third measuring feeder Z1c increases the amount of the discharged lubricant.

Alternatively, if the absolute value of the difference between the target value and the amount or the percentage of the principal agent in the mixed-powdery materials is more than the threshold continuously for at least a certain period, then the target value of the discharged amount of the powdery materials commanded by the controller C to the measuring feeders Z1a to Z1c can be changed to optimize the amount of the fed principal agent. In a case where the measured amount or the measured percentage of the principal agent in the mixed-powdery materials is less than the target value, the first measuring feeder Z1a has a higher target value of the amount of the discharged principal agent, and/or the second measuring feeder Z1b has a lower target value of the amount of the discharged excipient or the like and the third measuring feeder Z1c has a lower target value of the amount of the discharged lubricant. In another case where the measured amount or the measured percentage of the principal agent in the mixed-powdery materials is more than the target value, the first measuring feeder Z1a has a lower target value of the amount of the discharged principal agent, and/or the second measuring feeder Z1b has a higher target value of the amount of the discharged excipient or the like and the third measuring feeder Z1c has a higher target value of the amount of the discharged lubricant.

In a case where the absolute value of the difference between the target value and the amount or the percentage of the principal agent in the mixed-powdery materials repeatedly measured by any of the first to fifth sensors S1 to S5 is more than the threshold not continuously for at least a certain period but is more than the threshold instantaneously or only for a short period, (the principal agent, the excipient or the like, or the lubricant of) the mixed-powdery materials moving toward the feeder X of the compression-molding machine is regarded as having segregation (i.e., locally having portions of high and low concentrations of the principal agent). In this case, the controller C changes (i.e., increases or decreases) a current rotational speed of the agitation shaft Z33 and the agitating rotors Z34 and Z35 of the vertical mixer Z3, and/or changes (i.e., increases or decreases) a current rotational speed of the agitation shaft Z42 and the agitating rotor Z44 of the horizontal mixer Z4, for further improvement in mixing degree of the powdery materials.

Also in the case where the absolute value of the difference between the target value and the amount or the percentage of the principal agent in the mixed-powdery materials is more than the threshold continuously for at least the certain period, the controller C can control to change a current rotational speed of the agitating rotors Z34 and Z35 of the vertical mixer Z3 and/or to change current rotational speed of the agitating rotor Z44 of the horizontal mixer Z4.

Compression molding a molded product with use of the molding machine can have serious tableting failures like binding of the powdery material remaining on the inner circumferential surface of the die bore 4 to obtain a chipped molded product, sticking of the powdery material remaining at the punch tip 53 or 63 of the punch 5 or 6 to obtain a chipped molded product, and capping to obtain a broken molded product. The molded product can also have inadequate hardness.

High friction between the molded product compressed in the die bore 4 and the inner circumference of the die bore 4 leads to an excessive pressure applied to the lower punch 6 that is pushing the molded product out of the die bore 4. This may cause a strong friction between the head 61 of the lower punch 6 and the push-up rail R4 as a cam rail to cause a crack, abrasion, or damage of the head 61 of the lower punch 6 or the push-up rail R4.

In order to inhibit such defectiveness of the molded product or wear of the constituent member 6 or R4 of the molding machine, the controller C in the system adjusts by increasing or decreasing the amount of an internal lubricant preliminarily mixed with the powdery material to be filled in the die bore 4 (i.e., a ratio of the lubricant to the powdery material), and/or the amount of the external lubricant applied to the inner circumference of the die bore 4 and the punch tips 53 and 63, in accordance with whether or not the molded product has defectiveness, pressure applied to the lower punch 6 pushing the molded product out of the die bore 4, temperature of the die bore 4, the upper punch 5, or the lower punch 6, temperature of the powdery material, or humidity of the powdery material.

The internal lubricant is increased in amount by increasing the amount of the lubricant discharged from the third measuring feeder Z1c in the powdery-material feeding device Z, and/or by decreasing the amount of the principal agent discharged from the first measuring feeder Z1a, or the amount of the excipient or the like discharged from the second measuring feeder Z1b. In contrast, the internal lubricant is decreased in amount by decreasing the amount of the lubricant discharged from the third measuring feeder Z1c, and/or by increasing the amount of the principal agent discharged from the first measuring feeder Z1a, or the amount of the excipient or the like discharged from the second measuring feeder Z1b.

The external lubricant is increased in applied amount by increasing the flow rate of the lubricant sprayed from the spray nozzles Y1 and Y2 of the spray device Y in the molding machine, prolonging a time to spray the lubricant from the spray nozzles Y1 and Y2, or increasing a voltage applied to the static electricity generation electrode Y13 configured to charge the sprayed lubricant to increase an amount of electric charge. The external lubricant is decreased in applied amount by decreasing the flow rate of the lubricant sprayed from the spray nozzles Y1 and Y2 of the spray device Y, shortening a time to spray the lubricant from the spray nozzles Y1 and Y2, or decreasing a voltage applied to the static electricity generation electrode Y13 configured to charge the sprayed lubricant to decrease the amount of electric charge.

Specific examples of defectiveness of the molded product include binding of the powdery material, as a constituent material for the molded product, remaining on the inner circumferential surface of the die bore 4 to cause roughness or chipping at the outer circumferential surface of the molded product, sticking of the powdery material remaining at the lower end surface of the punch tip 53 of the upper punch 5 or the upper end surface of the punch tip 63 of the lower punch 6 to cause roughness or chipping at the upper surface or the lower surface of the molded product, capping to cause compression molded product to be broken, and inadequate hardness of the molded product. Binding and sticking can be inhibited by increasing the amount of the internal lubricant mixed with the powdery material, or increasing the amount of the external lubricant to be applied to the die bore 4 and the punch tips 53 and 63. In contrast, capping can be inhibited by decreasing the amount of the internal lubricant mixed with the powdery material. Hardness of the molded product can also be improved (i.e., enhanced) by decreasing the amount of the internal lubricant.

Upon detection of binding or sticking, the controller C increases the amount of the internal lubricant mixed with the powdery material to excess base quantity (i.e., fundamental quantity for production of the molded product, set in accordance with size, shape, weight, contents, and the like of the molded product), and/or increases the amount of the external lubricant applied to the die bore 4 and the punch tips 53 and 63 to excess base quantity. Whether the molded product has binding or sticking can be determined through an analysis of an image obtained by a camera sensor (i.e., image sensor) S6 configured to capture the compression molded product, or a camera sensor S6 configured to capture the die bore 4 or the punch tip 53 or 63. Upon detection of binding or sticking, the controller C gradually increases the amount of the internal lubricant and/or the amount of the external lubricant until recurrence of binding or sticking is eliminated. Upon no more detection of binding or sticking, the controller C gradually decreases the amount of the internal lubricant and/or the amount of the external lubricant toward the base quantity thereof as long as recurrence is not observed.

When capping is detected or when hardness of the molded product is less than a threshold, the controller C decreases the amount of the internal lubricant mixed with the powdery material to become less than the base quantity. Whether or not the molded product has capping can be determined through an analysis of an image obtained by the camera sensor S6 configured to capture the compression molded product. Hardness of the molded product can be found through measurement with use of a durometer or near infrared reflectance with use of a near infrared sensor S7. Whether or not hardness of the molded product reaches a desired threshold can be determined alternatively by sampling tableting sound generated instantaneously when the punches 5 and 6 compress the powdery material in the die bore 4 and executing a voice analysis. Upon detection of capping or that hardness of the molded product does not reach the desired threshold, the controller C gradually decreases the amount of the internal lubricant until recurrence of capping is eliminated. Upon no more detection of capping or inadequate hardness of the molded product, the controller C gradually increases the amount of the internal lubricant toward the base quantity thereof as long as recurrence is not observed. The controller C can alternatively execute a feedback control of increasing or decreasing the amount of the internal lubricant to reduce a difference between hardness of the molded product and a target value.

Furthermore, in the case where capping is detected or hardness of the molded product is less than the threshold, in comparison to the contrary case, the controller C can decrease rotational speed of the motor 8 of the molding machine as well as the turret 3 and the punches 5 and 6, and prolong time to apply pressure from the punches 5 and 6 to the powdery material in the die bore 4 (i.e., time to press the punches 5 and 6 by the rolls 12 to 15).

If determining that pressure applied to the lower punch 6 pushing the molded product out of the die bore 4 in the molding machine is large to be not less than a threshold, then the controller C increases the amount of the internal lubricant mixed with the powdery material to exceed the base quantity, and/or increases the amount of the external lubricant applied to the die bore 4 and the punch tips 53 and 63 to exceed the base quantity. Increase in amount of the lubricant will achieve a reduction in friction between the molded product and the inner circumferential surface of the die bore 4 and a decrease in pressure applied to the lower punch 6 pushing the molded product out of the die bore 4.

A level of pressure applied to the lower punch 6 pushing the molded product out of the die bore 4 (i.e., a force acting between the head 61 of the lower punch 6 and the push-up rail R4) can be estimated through measurement with use of a displacement sensor S8 configured to detect deformation or displacement of the push-up rail R4 (a distance measurement sensor, exemplified by a contactless displacement sensor like a laser displacement sensor, an eddy current magnetic displacement sensor, or a ultrasonic displacement sensor, or a contact displacement sensor (that can be configured to measure a displacement amount according to temperature change)), a temperature sensor configured to detect heat caused by friction between the head 61 of the lower punch 6 and the push-up rail R4 (e.g., a thermocouple), a strain sensor configured to detect strain of the push-up rail R4 (e.g., a strain gauge), a shock sensor configured to detect impact on the push-up rail R4, or the like.

Whether or not pressure applied to the lower punch 6 pushing the molded product out of the die bore 4 reaches a predetermined threshold can alternatively be determined by sampling noise generated instantaneously when the head 61 of the lower punch 6 slides along the push-up rail R4 and executing a voice analysis. When determining that pressure applied to the lower punch 6 pushing the molded product out of the die bore 4 is not less than the predetermined threshold, the controller C gradually increases the amount of the internal lubricant and/or the amount of the external lubricant until the pressure becomes less than the threshold. Upon determination that the pressure becomes less than the threshold, the controller C gradually decreases the amount of the internal lubricant and/or the amount of the external lubricant toward the base quantity thereof as long as the pressure again does not increase to become not less than the threshold. The controller C can alternatively execute a feedback control of increasing or decreasing the amount of the internal lubricant and/or the amount of the external lubricant to reduce a difference between pressure applied to the lower punch 6 pushing the molded product out of the die bore 4 and a target value.

The controller C can still alternatively be configured to measure with use of a required sensor, temperature of the die bore 4, the upper punch 5, or the lower punch 6, temperature of the powdery material filled in the die bore 4, and/or humidity of the powdery material, and execute feedforward control of increasing or decreasing the amount of the internal lubricant and/or the amount of the external lubricant from the base quantity if the temperature and/or the humidity is out of a predetermined range. The predetermined range for the temperature of the die bore 4, the temperature of the punch 5 or 6, the temperature of the powdery material, and/or the humidity of the powdery material is set to prevent or adequately inhibit defectiveness of the molded product or wear of the head 61 of the lower punch 6 or the push-up rail R4. If the temperature and/or the humidity falls within the predetermined range, then the amount of the internal lubricant and/or the amount of the external lubricant is basically adjusted to the base quantity. When the temperature and/or the humidity falls within the predetermined range, the amount of the internal lubricant and/or the amount of the external lubricant is increased from the base quantity under a condition with possible binding, sticking, wear of the head 61 of the lower punch 6 or the push-up rail R4, and the amount of the internal lubricant and/or the amount of the external lubricant is decreased from the base quantity under a condition with possible capping or inadequate hardness of the molded product.

The exemplary embodiment provides a controller C for a compression-molding machine configured to fill a die bore 4 with a powdery material and to compress the powdery material with use of an upper punch 5 and a lower punch 6 to obtain a molded product, and/or a powdery-material feeding device Z configured to feed the compression-molding machine with the powdery material, and the controller is configured to adjust by increasing or decreasing an amount of a lubricant mixed with the powdery material, and/or an amount of a lubricant applied to an inner circumference of the die bore 4 and tips 53 and 63, in accordance with whether or not the molded product has defectiveness, pressure applied to the lower punch 6 pushing the molded product out of the die bore 4, temperature of the die bore 4, the upper punch 5, or the lower punch 6, temperature of the powdery material, or humidity of the powdery material.

The exemplary embodiment inhibits defectiveness of the molded product during production of the molded product with use of the compression-molding machine and wear of the lower punch 6 and the cam rail R4 as the constituent members of the molding machine, to achieve continuous operation for a long period of time without stopping the molding machine and the powdery-material feeding device Z. The exemplary embodiment thus achieves further improvement in productivity of the molded products.

The invention is not limited to the exemplary embodiment detailed above. Time to mix the internal lubricant to be mixed with the powdery material (i.e., preliminarily before being fed to the molding machine) and the powdery material can alternatively be adjusted by prolonging or shortening, in accordance with whether or not the molded product has defectiveness, pressure applied to the lower punch 6 pushing the molded product out of the die bore 4, temperature of the die bore 4, the upper punch 5, or the lower punch 6, temperature of the powdery material, or humidity of the powdery material.

Inappropriate short time to mix the powdery material to be filled in the die bore 4 and the internal lubricant leads to deterioration in mixing degree of the powdery material and the lubricant, to increase possibility of future tableting failure like binding or sticking in the compression-molding machine. Extremely long mixing time allows the lubricant to coat particles of the powdery material, to possibly affect quality of the molded product such as reduction in speed of elution of the principal agent (e.g., a main ingredient or an active ingredient) from the completed molded product.

Inhibition of binding or sticking or reduction in pressure applied to the lower punch 6 pushing the molded product out of the die bore 4 can effectively be achieved by prolonging time to mix the powdery material with the internal lubricant. The lubricant to be mixed with the powdery material and the powdery material are thus mixed together for longer time if binding or sticking occurs or pressure applied to the lower punch pushing the molded product out of the die bore increases to become not less than the threshold. Too long mixing time may cause quality defectiveness of the molded product, and the mixing time is thus preferably shortened as long as binding or sticking does not occur or pressure applied to the lower punch 6 pushing the molded product out of the die bore 4 does not increase, and as long as the molded product does not have segregation of contents.

When the internal lubricant is mixed with the powdery material with use of the horizontal mixer Z4 according to the exemplary embodiment, the powdery material is transferred while being agitated in the case Z41 in an extension direction of the case Z41 and the agitation rod Z42 and the lubricant is supplied or added to the powdery material. Time to mix the powdery material and the lubricant is prolonged or shortened in accordance with a position in the extension direction of the case Z41 and the agitation rod Z42, where the lubricant is supplied to the powdery material (i.e., a distance from the position where the lubricant is supplied to the discharge port Z413 of the horizontal mixer Z4). As shown exemplarily in FIG. 10, the horizontal mixer Z4 includes a plurality of feed ports Z412, Z412x, and Z412y aligned in the extension direction of the case Z41 and the agitation rod Z42. Time to mix the powdery material and the lubricant is longer in a case where (the main pipe Z2c2 of) the third connecting pipe Z2c is connected to the feed port Z412y distant from the discharge port Z413, in comparison to a case where the third connecting pipe Z2c is connected to the feed port Z412 closer to the discharge port Z413.

If a mixer configured to mix a powdery material and an internal lubricant can adjust mixing time with no manpower (e.g., the horizontal mixer Z4 includes a mechanism configured to change a position where the lubricant is supplied to the powdery material, or a mechanism configured to switch among the feed ports Z412, Z412x, and Z412y to be connected with the third connecting pipe Z2c), then the controller C can automatically control to prolong the time to mix the powdery material and the lubricant from base time when binding or sticking is detected or when pressure applied to the lower punch 6 pushing the molded product out of the die bore 4 increases to become not less than the threshold in the molding machine. The controller C can control to gradually shorten the time to mix the powdery material with the lubricant to become close to the base time when no more binding or sticking is detected or when the pressure applied to the lower punch 6 pushing the molded product out of the die bore 4 decreases to become not more than the threshold.

The specific configuration of each portion can be modified within the range not departing from the purpose of the exemplary invention.

The descriptions of the various exemplary embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A controller for a compression-molding machine configured to fill a die bore with a powdery material and to compress the powdery material by an upper punch and a lower punch to obtain a molded product, or a powdery-material feeding device configured to feed the compression-molding machine with the powdery material, wherein the controller is configured to adjust, by increasing or decreasing an amount of a lubricant mixed with the powdery material, an amount of a lubricant applied to an inner circumference of the die bore and punch tips, or a time to mix the lubricant to be mixed with the powdery material and the powdery material, in accordance with whether or not the molded product has a defectiveness, a temperature of the die bore, the upper punch, or the lower punch, a temperature of the powdery material, or a humidity of the powdery material.

2. The controller according to claim 1, wherein, upon an occurrence of binding or sticking of the powdery material adhering to and remaining on the inner circumference of the die bore or the punch tip, the controller increases the amount of the lubricant mixed with the powdery material, increases the amount of the lubricant applied to the inner circumference of the die bore and the punch tips, or prolongs the time to mix the lubricant to be mixed with the powdery material and the powdery material.

3. The controller according to claim 1, wherein, when g pressure applied to the lower punch pushing the molded product out of the die bore is more than a threshold value, the controller increases the amount of the lubricant mixed with the powdery material, increases the amount of the lubricant applied to the inner circumference of the die bore and the punch tip, or prolongs the time to mix the lubricant to be mixed with the powdery material and the powdery material.

4. The controller according to claim 1, wherein, when the molded product has a hardness less than a threshold value, the controller decreases the amount of the lubricant mixed with the powdery material.

5. The controller according to claim 1, wherein, upon an occurrence of capping of the molded product broken into a plurality of portions, the controller decreases the amount of the lubricant mixed with the powdery material.

6. The controller according to claim 2, wherein, when a pressure applied to the lower punch pushing the molded product out of the die bore is more than a threshold value, the controller increases the amount of the lubricant mixed with the powdery material, increases the amount of the lubricant applied to the inner circumference of the die bore and the punch tip, or prolongs the time to mix the lubricant to be mixed with the powdery material and the powdery material.

7. The controller according to claim 2, wherein, when the molded product has a hardness less than a threshold value, the controller decreases the amount of the lubricant mixed with the powdery material.

8. The controller according to claim 2, wherein, upon an occurrence of capping of the molded product broken into a plurality of portions, the controller decreases the amount of the lubricant mixed with the powdery material.

9. The controller according to claim 3, wherein, when the molded product has hardness less than a threshold value, the controller decreases the amount of the lubricant mixed with the powdery material.

10. The controller according to claim 3, wherein, upon an occurrence of capping of the molded product broken into a plurality of portions, the controller decreases the amount of the lubricant mixed with the powdery material.

11. The controller according to claim 4, wherein, upon an occurrence of capping of the molded product broken into a plurality of portions, the controller decreases the amount of the lubricant mixed with the powdery material.

12. A control method for a compression-molding machine configured to fill a die bore with a powdery material and to compress the powdery material by an upper punch and a lower punch to obtain a molded product, or a powdery-material feeding device configured to feed the compression-molding machine with the powdery material,
wherein the control method comprises:
adjusting, by increasing or decreasing an amount of a lubricant mixed with the powdery material, an amount of a lubricant applied to an inner circumference of the die bore and tips, or a time to mix the lubricant to be mixed with the powdery material and the powdery material, in accordance with whether or not the molded product has defectiveness, a temperature of the die bore, the upper punch, or the lower punch, a temperature of the powdery material, or a humidity of the powdery material.

13. The controller according to claim 1, wherein the controller is configured to adjust, by the increasing or the decreasing of the amount of the lubricant mixed with the powdery material, the amount of the lubricant applied to the inner circumference of the die bore and the punch tips.

14. The controller according to claim 1, wherein the controller is configured to adjust, by the increasing or the decreasing of the amount of the lubricant mixed with the powdery material, the time to mix the lubricant to be mixed with the powdery material and the powdery material.

15. A controller for a compression-molding machine configured to fill a die bore with a powdery material and to compress the powdery material by an upper punch and a lower punch to obtain a molded product, or a powdery-material feeding device configured to feed the compression-molding machine with the powdery material,
wherein the controller is configured to adjust, by the increasing or the decreasing of a time to mix the lubricant to be mixed with the powdery material and the powdery material, in accordance with whether or not the molded product has a defectiveness, a pressure applied to the lower punch pushing the molded product out of the die bore.

16. The controller according to claim 1, wherein the controller is configured to adjust, by the increasing or the decreasing of the amount of the lubricant mixed with the powdery material, the temperature of the die bore, the upper punch, or the lower punch.

17. The controller according to claim 1, wherein the controller is configured to adjust, by the increasing or the decreasing of the amount of the lubricant mixed with the powdery material, the temperature of the powdery material.

18. The controller according to claim 1, wherein the controller is configured to adjust, by the increasing or the decreasing of the amount of the lubricant mixed with the powdery material, the humidity of the powdery material.

19. A compression-molding system, comprising:
a controller; and
a compression-molding machine configured to fill a die bore with a powdery material and to compress the powdery material by an upper punch and a lower punch to obtain a molded product,
wherein the controller is configured to adjust, by increasing or decreasing an amount of a lubricant mixed with the powdery material, an amount of a lubricant applied to an inner circumference of the die bore and the punch tips, or a time to mix the lubricant to be mixed with the powdery material and the powdery material, in accordance with whether or not the molded product has a defectiveness, a temperature of the die bore, the upper punch, or the lower punch, a temperature of the powdery material, or a humidity of the powdery material.

20. The compression-molding system according to claim 19, wherein the controller controls a powdery-material feeding device configured to feed the compression-molding machine with the powdery material, and
wherein, when a pressure applied to the lower punch pushing the molded product out of the die bore is more than a threshold value, the controller increases the amount of the lubricant mixed with the powder material, increases the amount of the lubricant applied to the inner circumference of the die bore and the punch tip, or prolongs the time to mix the lubricant to be mixed with the powdery material and the powdery material.

* * * * *